(12) United States Patent
Ono et al.

(10) Patent No.: US 10,443,136 B2
(45) Date of Patent: Oct. 15, 2019

(54) ELECTROCHEMICAL REACTION DEVICE

(71) Applicant: Kabushiki Kaisha Toshiba, Minato-ku (JP)

(72) Inventors: Akihiko Ono, Kita (JP); Satoshi Mikoshiba, Yamato (JP); Jun Tamura, Minato (JP); Norihiro Yoshinaga, Kawasaki (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 180 days.

(21) Appl. No.: 15/412,416

(22) Filed: Jan. 23, 2017

(65) Prior Publication Data
US 2017/0130342 A1 May 11, 2017

Related U.S. Application Data

(63) Continuation of application No. PCT/JP2015/005913, filed on Nov. 27, 2015.

(30) Foreign Application Priority Data

Nov. 28, 2014 (JP) .................................. 2014-241690

(51) Int. Cl.
  *C25B 3/04* (2006.01)
  *C25B 9/10* (2006.01)
  (Continued)

(52) U.S. Cl.
  CPC ................ *C25B 1/003* (2013.01); *C25B 1/00* (2013.01); *C25B 1/10* (2013.01); *C25B 3/04* (2013.01);
  (Continued)

(58) Field of Classification Search
  CPC ...................................................... C25B 1/003
  (Continued)

(56) References Cited

U.S. PATENT DOCUMENTS 2,967,806 A * 1/1961 Miller ....................... C25B 1/16
                                                                          204/263
3,869,376 A * 3/1975 Tejeda ................... B01D 61/48
                                                                          204/632

(Continued)

FOREIGN PATENT DOCUMENTS

CA        2 287 209 A1    7/1999
CN        1251209         4/2000
(Continued)

OTHER PUBLICATIONS

International Search Report dated Feb. 2, 2016 in PCT/JP2015/005913, filed on Nov. 27, 2015 ( with English Translation).
(Continued)

*Primary Examiner* — Harry D Wilkins, III
(74) *Attorney, Agent, or Firm* — Oblon, McClelland, Maier & Neustadt, L.L.P.

(57) ABSTRACT

An electrochemical reaction device comprises: an electrolytic solution tank including a first region, a second region, and a path; a reduction electrode disposed in the first region; an oxidation electrode disposed in the second region; and a power source connected to the reduction electrode and oxidation electrode; and a plurality of ion exchange membranes separating the first region and the second region.

11 Claims, 14 Drawing Sheets

(51) Int. Cl.
*C25B 1/10* (2006.01)
*C25B 11/03* (2006.01)
*C25B 13/08* (2006.01)
*C25B 15/08* (2006.01)
*C25B 1/00* (2006.01)

(52) U.S. Cl.
CPC .............. *C25B 9/10* (2013.01); *C25B 11/035* (2013.01); *C25B 13/08* (2013.01); *C25B 15/08* (2013.01); *Y02E 60/366* (2013.01); *Y02P 20/135* (2015.11)

(58) Field of Classification Search
USPC .......................................... 205/340; 204/248
See application file for complete search history.

(56) References Cited

U.S. PATENT DOCUMENTS

| | | | | |
|---|---|---|---|---|
| 4,011,149 | A * | 3/1977 | Nozik | C25B 1/003 204/192.26 |
| 4,197,421 | A * | 4/1980 | Steinberg | C07C 29/1518 205/555 |
| 4,437,954 | A * | 3/1984 | Sammells | B01J 19/122 204/157.15 |
| 5,358,609 | A * | 10/1994 | Drackett | C25B 1/30 205/344 |
| 8,388,818 | B1 * | 3/2013 | Menezes | C25B 1/003 204/248 |
| 8,791,354 | B2 * | 7/2014 | Iwasaki | B01D 53/326 136/243 |
| 8,961,774 | B2 * | 2/2015 | Cole | C25B 9/08 205/334 |
| 9,708,717 | B2 * | 7/2017 | Ono | C25B 9/00 |
| 2005/0194041 | A1 * | 9/2005 | Fan | H01L 31/076 136/252 |
| 2011/0315560 | A1 * | 12/2011 | Rabaey | C02F 1/4618 205/344 |
| 2012/0267234 | A1 | 10/2012 | Reece et al. | |
| 2013/0075250 | A1 * | 3/2013 | Tokuhiro | C01B 3/042 204/252 |
| 2013/0105304 | A1 * | 5/2013 | Kaczur | C25B 9/10 204/237 |
| 2013/0146473 | A1 * | 6/2013 | Lambert | C25B 1/26 205/510 |
| 2013/0277209 | A1 | 10/2013 | Sato et al. | |
| 2015/0252483 | A1 | 9/2015 | Ono et al. | |
| 2016/0076158 | A1 * | 3/2016 | Tamura | C25B 1/003 204/242 |

FOREIGN PATENT DOCUMENTS

| | | | |
|---|---|---|---|
| CN | 104797740 | 7/2015 | |
| EP | 0 982 780 A1 | 3/2000 | |
| EP | 2 924 147 A1 | 9/2015 | |
| GB | 2414243 A * | 11/2005 | ............. C25B 1/003 |
| JP | 63-28895 | 2/1988 | |
| JP | 10-290017 | 10/1998 | |
| JP | 11-151493 | 6/1999 | |
| JP | 2000-64080 | 2/2000 | |
| JP | 2000-199092 | 7/2000 | |
| JP | 2004-225133 | 8/2004 | |
| JP | 2011-94194 | 5/2011 | |
| JP | 2013-234357 | 11/2013 | |
| JP | 2014-101550 | 6/2014 | |
| KR | 10-2015-0074060 | 7/2015 | |
| TW | 201433358 | 9/2014 | |
| WO | WO 99/38215 | 7/1999 | |
| WO | WO 2012/091045 A1 | 7/2012 | |
| WO | WO 2014/080773 A1 | 5/2014 | |

OTHER PUBLICATIONS

Written Opinion dated Feb. 2, 2016 in PCT/JP2015/005913, filed on Nov. 27, 2015.
Steven Y. Reece et al. "Wireless Solar Water Splitting Using Silicon-Based Semiconductors and Earth-Abundant Catalysts", Science vol. 334, 2011, 5 pages.
Arthur J. Esswein et al "Highly active cobalt phosphate and borate based oxygen evolving catalysts operating in neutral and natural waters", Energy & Environmental Science, 2011, 6 pages.
Satoshi Yotsuhashi et al. "$CO_2$ Conversion with Light and Water by GaN Photoelectrode", Japanese Journal of Applied Physics 51, 2012, 3 pages.

* cited by examiner

ELECTROCHEMICAL REACTION DEVICE

CROSS-REFERENCE TO RELATED APPLICATIONS

This application is a continuation of prior International Application No. PCT/JP2015/005913 filed on Nov. 27, 2015, which is based upon and claims the benefit of priority from Japanese Patent Application No. 2014-241690 filed on Nov. 28, 2014; the entire contents of all of which are incorporated herein by reference.

FIELD

Embodiments described herein generally relate to an electrochemical reaction device.

BACKGROUND

In recent years, an artificial photosynthesis technique of electrochemically converting sunlight into a chemical substance in imitation of photosynthesis of plants has been under development from viewpoints of energy problems and environmental problems. The case of converting the sunlight into the chemical substance and storing it in a cylinder or tank has advantages that the storage cost of energy can be reduced and the storage loss is small as compared to the case of converting the sunlight into electricity and storing it in storage batteries.

As an electrochemical reaction device that electrochemically converts the sunlight into a chemical substance, there has been known, for example, a two-electrode type device that includes an electrode having a reduction catalyst for reducing carbon dioxide ($CO_2$) and an electrode having an oxidation catalyst for oxidizing water ($H_2O$), and in which these electrodes are immersed in water where $CO_2$ is dissolved. These electrodes are connected to each other via an electric wire or the like. In the electrode having the oxidation catalyst, $H_2O$ is oxidized by light energy, and thereby oxygen ($½O_2$) is obtained and a potential is obtained. In the electrode having the reduction catalyst, $CO_2$ is reduced and formic acid (HCOOH) or the like is produced by obtaining a potential from the electrode causing the oxidation reaction. In the two-electrode type device, since a reduction potential of $CO_2$ is obtained by two-stage excitation, a conversion efficiency from the sunlight to chemical energy is about 0.04%. Besides, for example, there has been known a device in which the photoelectric conversion is performed by using GaN, water is oxidized at a surface thereof, and $CO_2$ is reduced by using a copper plate that is connected thereto as the electrochemical reaction device. A conversion efficiency of the above-described device is 0.2%.

An electrochemical reaction device using a stack (silicon solar cell or the like) where a photoelectric conversion layer is sandwiched between a pair of electrodes has been also under consideration. In the electrode on a light irradiation side, water ($2H_2O$) is oxidized by light energy, and thereby oxygen ($O_2$) and hydrogen ions ($4H^+$) are obtained. In the opposite electrode, by using the hydrogen ions ($4H^+$) produced in the electrode on the light irradiation side and potential ($e^-$) generated in the photoelectric conversion layer, hydrogen ($2H_2$) or the like is obtained as the chemical substance. Besides, there has been also known an electrochemical reaction device where silicon solar cells are stacked. The electrochemical reaction device preferably has a high conversion efficiency.

Causing reaction using, as an electrolytic solution, seawater, river water, or the like, which is present in large amounts, has been under consideration from the environmental aspect or the like. However, by using, for example, the river water or the like as an electrolytic solution, activity of a catalyst decreases due to impurities or the like, resulting in a decrease in conversion efficiency. Further, using an electrolytic solution having an extremely high pH or low pH causes a problem that members to be used deteriorate, or the like. As above, in the conventional electrochemical reaction device, kinds of usable electrolytic solutions are limited. The cost is high due to environmental restriction and limited members. Accordingly, there has been a problem of low versatility.

DETAILED DESCRIPTION

An electrochemical reaction device according to an embodiment comprises: an electrolytic solution tank including a first region to store a first electrolytic solution containing a first substance, a second region to store a second electrolytic solution containing a second substance, and a path connecting the first region and the second region; a reduction electrode disposed in the first region; an oxidation electrode disposed in the second region; a power source connected to the reduction electrode and the oxidation electrode; and a plurality of ion exchange membranes separating the first region and the second region.

Hereinafter, there will be explained embodiments with reference to the drawings. The drawings are schematic, and for example, a relation of the thickness and the planar dimension, a thickness ratio among layers, and so on may differ from actual ones. In the embodiments, substantially the same constituent elements are denoted by the same reference signs and an explanation thereof will be omitted.

Figure 1:
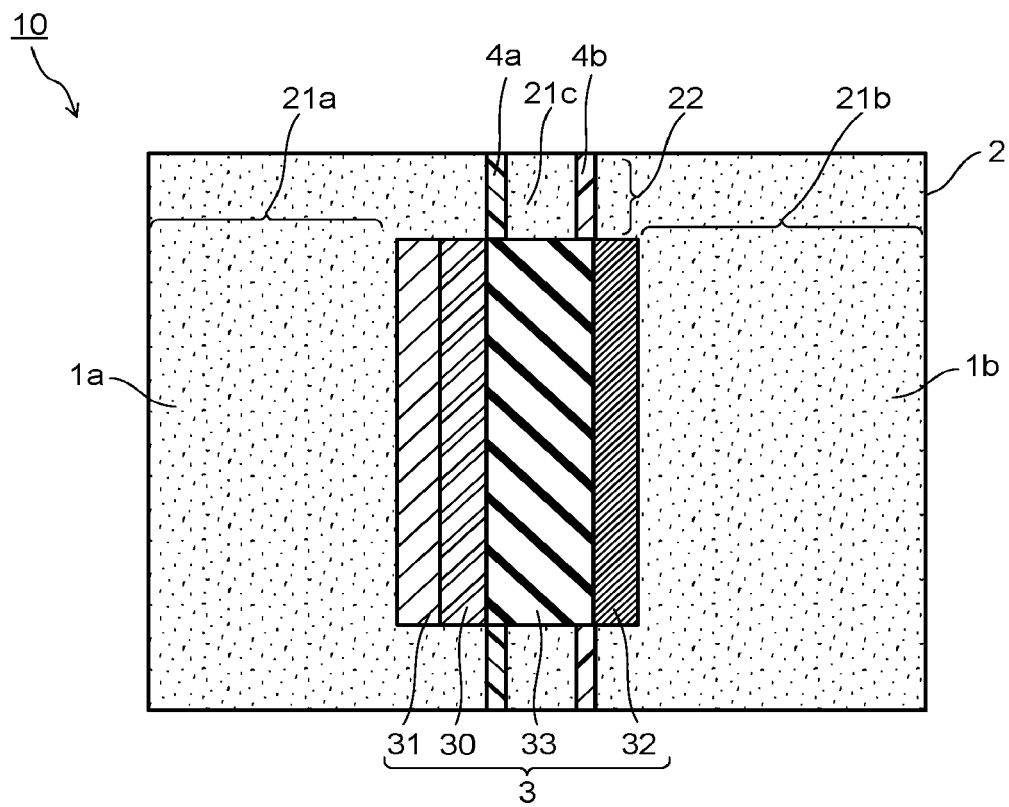
FIG. 1 is a schematic view illustrating a configuration example of an electrochemical reaction device.
Figure 2:
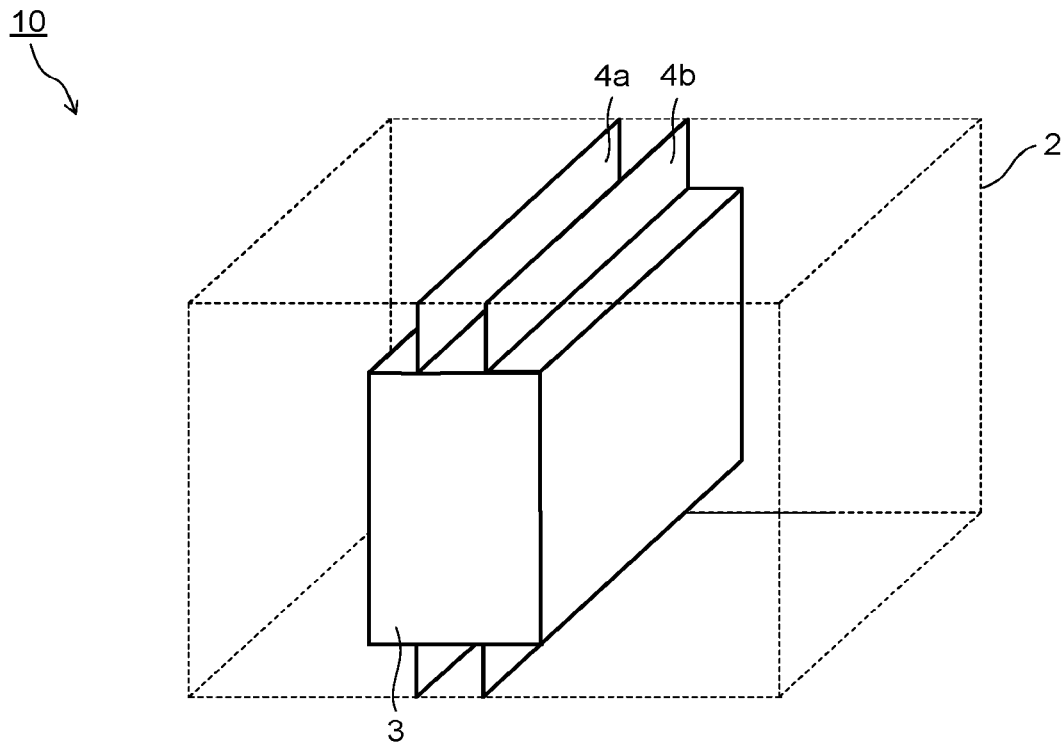
FIG. 2 is an external appearance schematic view illustrating the configuration example of the electrochemical reaction device.

FIG. 1 is a schematic view illustrating a configuration example of an electrochemical reaction device, and FIG. 2 is an external appearance schematic view illustrating a structure example of the electrochemical reaction device. An electrochemical reaction device 10 illustrated in FIG. 1 and FIG. 2 includes: an electrolytic solution tank 2 storing an electrolytic solution 1a and an electrolytic solution 1b; a photoelectric conversion cell 3; an ion exchange membrane 4a; and an ion exchange membrane 4b. An X-axis direction, a Y-axis direction, and a Z-axis direction of the electrochemical reaction device 10 are not limited in particular.

The electrolytic solution 1a contains at least a substance to be reduced and the electrolytic solution 1b contains at least a substance to be oxidized. The substance to be oxidized is a substance to be oxidized by an oxidation reaction, and the substance to be reduced is a substance to be reduced by a reduction reaction. For example, the substance to be oxidized contains water, and the substance to be reduced contains carbon dioxide. Changing an amount of water contained in the electrolytic solution 1b can change a production ratio of a chemical substance. The electrolytic solution 1a and the electrolytic solution 1b may be the same electrolytic solution. In this case, the electrolytic solution 1a and the electrolytic solution 1b can also be regarded as one electrolytic solution.

Impurities such as ions, which do not contribute to the oxidation reaction or the reduction reaction, may be contained in at least one of the electrolytic solution 1a or the electrolytic solution 1b. In this case, the ions that do not contribute to the oxidation reaction or the reduction reaction also include ions that hinder the oxidation reaction or the reduction reaction.

The electrolytic solution tank 2 includes: a first electrolytic solution region 21a that stores the electrolytic solution 1a; a second electrolytic solution region 21b that stores the electrolytic solution 1b, and an ion migration path 22 connecting the first electrolytic solution region 21a and the second electrolytic solution region 21b. The ion migration path 22 is a path enabling ions to migrate. The ion migration path 22 may store at least one of the electrolytic solution 1a or the electrolytic solution 1b, for example. At least one of the first electrolytic solution region 21a or the second electrolytic solution region 21b may include one portion of the ion migration path 22. The electrolytic solution tank 2 has a rectangular parallelepiped shape, but is not limited thereto. The electrolytic solution tank 2 further includes a plurality of ion migration paths 22, but is not limited thereto. An opening may be provided in one portion of the electrolytic solution tank 2.

The electrolytic solution 1b preferably has a pH higher than the pH of the electrolytic solution 1a. This facilitates migration of hydrogen ions, hydroxide ions, and the like. Further, a liquid junction potential due to the difference in pH enables effective progress of an oxidation-reduction reaction. The difference in pH decreases due to a reaction, thus making the oxidation-reduction reaction difficult to occur. However, for example, adjusting the pH, or supplying a naturally existing high pH solution or low pH solution enables the reaction to progress continuously with no external energy supply.

A supply flow path may be provided at the electrolytic solution tank 2, and at least one of the electrolytic solution 1a or the electrolytic solution 1b may be additionally supplied therethrough. A recovery path may be provided at the electrolytic solution tank 2, and produced chemical substances may be recovered therethrough.

The photoelectric conversion cell 3 has a function of causing the oxidation-reduction reaction when light enters the photoelectric conversion cell 3. The photoelectric conversion cell 3 includes: at least a conductive substrate 30; a reduction electrode 31; an oxidation electrode 32; and a photoelectric conversion body 33.

The conductive substrate 30 has a function as a support. The conductive substrate 30 may be provided in a manner to separate the first electrolytic solution region 21a and the second electrolytic solution region 21b. Providing the conductive substrate 30 enables an improvement in mechanical strength of the photoelectric conversion cell 3. Further, the conductive substrate 30 may be regarded as one part of the reduction electrode 31. Further, the conductive substrate 30 is not necessarily provided.

The reduction electrode 31 is immersed in the electrolytic solution 1a in the first electrolytic solution region 21a. The reduction electrode 31 contains, for example, a reduction catalyst that causes a reduction reaction of the substance to be reduced. A compound produced by the reduction reaction differs depending on the kind of reduction catalyst or the like. There can be cited, for example, carbon compounds such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), and formaldehyde (HCHO), hydrogen, and so on. The reduction electrode 31 may have a thin film shape, lattice shape, particulate shape, or wire-shape, for example. The reduction electrode 31 does not necessarily contain the reduction catalyst, and a reduction catalyst provided separately from the reduction electrode 31 may be connected to the reduction electrode 31.

The oxidation electrode 32 is immersed in the electrolytic solution 1b in the second electrolytic solution region 21b. The oxidation electrode 32 contains, for example, an oxidation catalyst that causes an oxidation reaction of the substance to be oxidized. A compound produced by the oxidation reaction differs depending on the kind of oxidation catalyst or the like. For example, hydrogen ions and so on can be cited. The oxidation electrode 32 may have a thin film shape, lattice shape, particulate shape, or wire-shape, for example. The oxidation electrode 32 does not necessarily contain the oxidation catalyst, and an oxidation catalyst provided separately from the oxidation electrode 32 may be connected to the oxidation electrode 32.

When light irradiates the photoelectric conversion body 33 through the oxidation electrode 32 to perform the oxidation-reduction reaction, the oxidation electrode 32 needs to have a light transmitting property. In this case, light transmittance of the oxidation electrode 32 is preferred to be, for example, at least 10% or more and more preferred to be 30% or more of an irradiation amount of the light irradiating the oxidation electrode 32. This is not restrictive, and for example, a structure in which light irradiates the photoelectric conversion body 33 through the reduction electrode 31 may be applied.

The photoelectric conversion body 33 has a first surface connected to the reduction electrode 31 and a second surface that is opposite the first surface and is connected to the oxidation electrode 32. The photoelectric conversion body 33 has a function of separating electric charges using energy of the irradiating light such as sunlight. Electrons generated by the charge separation move to the reduction electrode 31 side and holes move to the oxidation electrode 32 side. This enables the photoelectric conversion body 31 to generate electromotive force. As the photoelectric conversion body 33, for example, a photoelectric conversion body of a pn-junction type or a pin junction type can be used. The photoelectric conversion body 33 may be fixed to the electrolytic solution tank 2, for example. The photoelectric conversion body 33 may be formed by stacking a plurality of photoelectric conversion layers. A power source is not limited to the photoelectric conversion element having the photoelectric conversion body. Examples of the power source include a system power supply, a storage battery, or the renewable energy such as the wind power, water power, and the geothermal power.

The reduction electrode 31, the oxidation electrode 32, and the photoelectric conversion body 33 may be different in size. For example, a reduction electrode 31 and an oxidation electrode 32 each having at least one of lengths in longitudinal or lateral directions shorter than that of the photoelectric conversion body 33 may be provided.

The ion exchange membrane 4a and the ion exchange membrane 4b separate the first electrolytic solution region 21a and the second electrolytic solution region 21b. In other words, the ion exchange membrane 4a and the ion exchange membrane 4b partition the electrolytic solution tank 2. This is not restrictive, and the ion exchange membrane 4a may be provided in a manner to isolate at least the first electrolytic solution region 21a, and the ion exchange membrane 4b may be provided between the ion exchange membrane 4a and the second electrolytic solution region 21b in a manner to isolate at least the second electrolytic solution region 21b.

The ion exchange membrane 4a is in contact with the electrolytic solution 1a, and has a function of hindering at least one kind of anion from passing therethrough. The ion exchange membrane 4a has at least a cation exchange membrane. The ion exchange membrane 4b is in contact with the electrolytic solution 1b, and has a function of hindering at least one kind of cation from passing therethrough. The ion exchange membrane 4b has at least an anion exchange membrane. The ion exchange membrane 4a and the ion exchange membrane 4b both may be the cation exchange membrane, or the ion exchange membrane 4a and the ion exchange membrane 4b both may be the anion exchange membrane.

The ion exchange membrane 4a and the ion exchange membrane 4b may be fixed to the electrolytic solution tank 2. Further, the ion exchange membrane 4a and the ion exchange membrane 4b may be fixed to the photoelectric conversion cell 3. The ion exchange membrane 4a and the ion exchange membrane 4b may be fixed by providing an opening in the ion exchange membrane 4a and the ion exchange membrane 4b and putting the photoelectric conversion cell 3 in the openings, for example. Further, an opening may be provided in the photoelectric conversion cell 3 and at least one of the ion exchange membrane 4a or the ion exchange membrane 4b may be provided in the opening. The ion exchange membrane 4a and the ion exchange membrane 4b only need to be provided to come into contact with one of the conductive substrate 30, the reduction electrode 31, the oxidation electrode 32, and the photoelectric conversion body 33.

Figure 3:
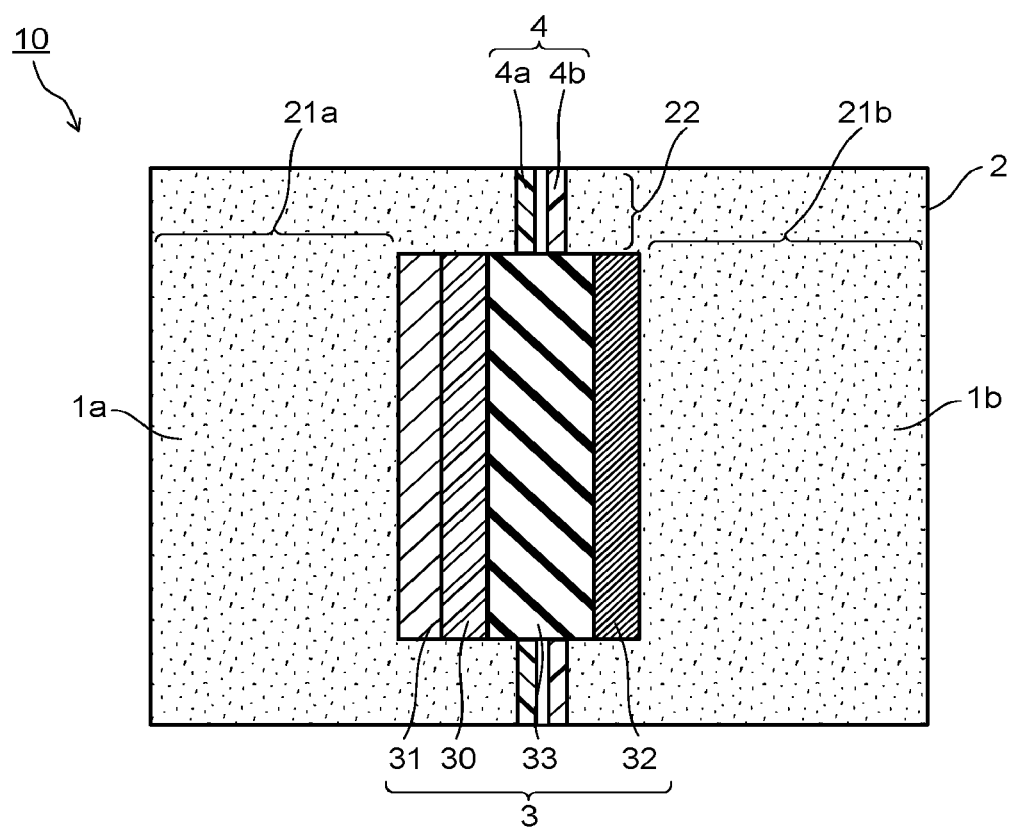
FIG. 3 is a schematic view illustrating another configuration example of the electrochemical reaction device.

A third electrolytic solution region 21c is between the ion exchange membrane 4a and the ion exchange membrane 4b. This makes it possible to provide a supply flow path or the like at the electrolytic solution tank 2 and supply an electrolytic solution into the third electrolytic solution region 21c through the supply flow path. This is not restrictive, and as illustrated in FIG. 3, a bipolar membrane 4 having a structure in which the ion exchange membrane 4a formed of the cation exchange membrane and the ion exchange membrane 4b formed of the anion exchange membrane are stacked may be provided. In this case, an adhesive layer bonding the ion exchange membrane 4a and the ion exchange membrane 4b together may be provided between the ion exchange membrane 4a and the ion exchange membrane 4b. Using the bipolar membrane 4 makes it possible to reduce the number of ion exchange membranes, reduces fixing places when the ion exchange membrane is fixed to the electrolytic solution tank 2, for example, and simplify the structure of the electrochemical reaction device 10. Further, the simplified structure facilitates maintenance when exchanging the ion exchange membrane to deteriorate due to reaction.

Figure 4:
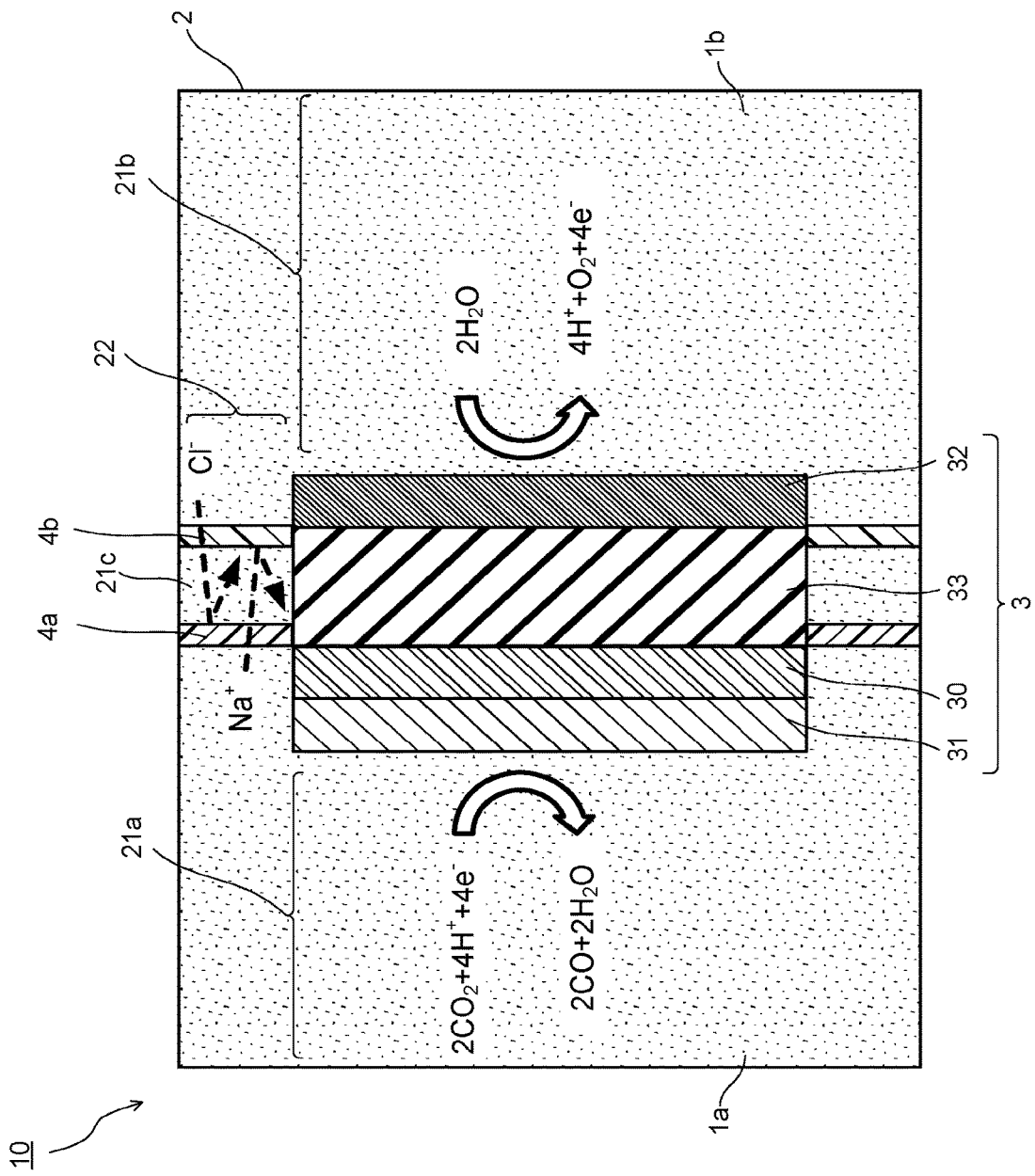
FIG. 4 is a schematic view illustrating an operation example of the electrochemical reaction device.

Next, there is explained an operation example of the electrochemical reaction device 10 with reference to FIG. 4. Here, as one example, a case of using the cation exchange membrane as the ion exchange membrane 4a, the anion exchange membrane as the ion exchange membrane 4b, and an electrolytic solution containing water, carbon dioxide, and sodium chloride as the electrolytic solution 1a and the electrolytic solution 1b to produce carbon monoxide is explained. FIG. 4 is a schematic view for explaining the operation example of the electrochemical reaction device 10. In the operation example of the electrochemical reaction device 10, light enters the photoelectric conversion body 33 through the oxidation electrode 32. The light is preferred to be the sunlight, but is not limited thereto, and may be light of a light-emitting diode, an organic EL, or the like, for example. When the light enters, the photoelectric conversion body 33 absorbs the light and generates photoexcited electrons and holes to separate the light. At this time, the photoexcited electrons gather at the reduction electrode 31 side and the holes gather at the oxidation electrode 32 side. This causes electromotive force in the photoelectric conversion body 33.

When the holes gather at the oxidation electrode 32, as expressed by the following formula (1), an oxidation reaction of water occurs to produce oxygen and hydrogen ions.

$$2H_2O \rightarrow 4H^+ + O_2 + 4e^- \quad (1)$$

The ion exchange membrane 4a and the ion exchange membrane 4b may allow the hydrogen ions produced by the oxidation reaction to pass therethrough. By allowing the hydrogen ions to pass therethrough as above, diffusibility of substances such as ions can be increased.

When the photoexcited electrons gather at the reduction electrode 31, as expressed by the following formula (2), a reduction reaction of carbon dioxide occurs in which carbon dioxide and hydrogen ions react with each other to produce carbon monoxide and water, which are a carbon compound. Carbon monoxide dissolves in the electrolytic solution 1a at an arbitrary ratio. Further, separately from the carbon monoxide, hydrogen may be produced. At this time, the hydrogen may be produced simultaneously with the carbon monoxide.

$$2CO_2 + 4H^+ + 4e^- \rightarrow 2CO + 2H_2O \quad (2)$$

In this case, cations such as sodium ions ($Na^+$) contained in the electrolytic solution $1a$ are hindered by the ion exchange membrane $4b$ from migrating to the second electrolytic solution region $21b$ side. Further, anions such as chloride ions ($Cl^-$) contained in the electrolytic solution $1b$ are hindered by the ion exchange membrane $4a$ from migrating to the first electrolytic solution region $21a$ side.

The photoelectric conversion body 33 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in the formula (1) is 1.23 [V], and the standard oxidation-reduction potential of the reduction reaction in the formula (2) is −0.11 [V]. Therefore, the open-circuit voltage of the photoelectric conversion body 33 needs to be 1.33 [V] or more. Further, the open-circuit voltage of the photoelectric conversion body 33 is preferred to be equal to or more than the sum of the potential difference and overvoltages. For example, when the overvoltages of the oxidation reaction in the formula (1) and the reduction reaction in the formula (2) are both 0.2 [V], the open-circuit voltage is preferred to be 1.73 [V] or more.

The above-described reduction reaction of carbon dioxide is a reaction consuming hydrogen ions. This means that a small amount of the hydrogen ions results in low efficiency of the reduction reaction. Therefore, the concentration of the hydrogen ions in the first electrolytic solution region $21a$ and the concentration of the hydrogen ions in the second electrolytic solution region $21b$ are preferably made to differ in advance to facilitate the migration of the hydrogen ions due to the concentration difference. This is not restrictive, and the concentration of negative ions (for example, hydroxide ions or the like) may be different between the first electrolytic solution region $21a$ and the second electrolytic solution region $21b$.

In the electrochemical reaction device, the electrolytic solution suitable for the oxidation reaction and the electrolytic solution suitable for the reduction reaction are different from each other. Therefore, the electrolytic solution $1a$ preferably has a characteristic suitable for the reduction reaction, and the electrolytic solution $1b$ preferably has a characteristic suitable for the oxidation reaction. In this case, it is possible to consider that for example, the ion exchange membranes partition the electrolytic solution region into the first electrolytic solution region $21a$ and the second electrolytic solution region $21b$, to thereby make the electrolytic solution $1a$ and the electrolytic solution $1b$ differ in the characteristic in each region.

However, the cation exchange membrane has a relatively low resistance to alkali and a relatively high resistance to acid. The anion exchange membrane has a relatively low resistance to acid and a relatively high resistance to alkali. That is, a preferred ion exchange membrane differs depending on the characteristic of the electrolytic solution. Therefore, even if only one kind of ion exchange membrane out of the anion exchange membrane and the cation exchange membrane is provided, the ion exchange membrane is likely to deteriorate because both surfaces of the ion exchange membrane are in contact with electrolytic solutions having characteristics different from each other and consequently, one of the surfaces of the ion exchange membrane is in contact with the unsuitable electrolytic solution.

In contrast to this, the electrochemical reaction device according to this embodiment includes a plurality of the ion exchange membranes that separate the first electrolytic solution region $21a$ and the second electrolytic solution region $21b$. For example, by providing the ion exchange membrane $4b$ between the ion exchange membrane $4a$ and the second electrolytic solution region $21b$, the ion exchange membrane $4a$ suitable for the electrolytic solution $1a$ can be prevented from directly coming into contact with the electrolytic solution $1b$. Further, by providing the ion exchange membrane $4a$ between the ion exchange membrane $4b$ and the first electrolytic solution region $21a$, the ion exchange membrane $4b$ suitable for the electrolytic solution $1b$ can be prevented from directly coming into contact with the electrolytic solution $1a$. Using a plurality of the ion exchange membranes as above makes it possible to suppress deterioration of the ion exchange membranes. Accordingly, for example, the kinds of usable electrolytic solutions increase, resulting in that it is possible to increase versatility.

Further, the above-described configuration controls migration of specific ions, resulting in that it is possible to improve ion selectivity. In the first electrolytic solution region $21a$, for example, the ion exchange membrane $4a$ and the ion exchange membrane $4b$ suppress a decrease in cations used for the reduction reaction and suppress an increase in anions that do not contribute to the reduction reaction. Thereby, the characteristics of the electrolytic solution $1a$ and the electrolytic solution $1b$ are maintained, resulting in that it is possible to suppress a decrease in conversion efficiency from light to a chemical substance.

This also enables a difference in pH, a liquid junction potential, or the like to be provided between the electrolytic solution $1a$ and the electrolytic solution $1b$, for example. For example, gold is used as the reduction catalyst, and sodium carbonate and a potassium aqueous solution are used as the electrolytic solution $1a$. A Co phosphoric acid-based catalyst is used as the oxidation catalyst and a solution containing potassium phosphate and sodium is used as the electrolytic solution $1b$, and thereby the pH of the electrolytic solution $1b$ becomes nine or more. This causes a difference in pH between the electrolytic solution $1a$ and the electrolytic solution $1b$, to then cause a liquid junction potential, thereby enabling promotion of the oxidation-reduction reaction.

Further, by providing the third electrolytic solution region $21c$ between the ion exchange membrane $4a$ and the ion exchange membrane $4b$, for example, a liquid containing a large number of impurities such as seawater or industrial water can be used as the electrolytic solution. When performing a reduction reaction of $CO_2$, for example, an aqueous solution recovered from a power plant or the like, which is an emission source of $CO_2$, an amine solution used for CCS or the like, or the like is preferably made applicable, and thus a decrease in conversion efficiency caused by mixture of the electrolytic solution $1a$ and the electrolytic solution $1b$ results in a significant problem. Accordingly, it is preferred to use the configuration of the electrochemical reaction device according to this embodiment.

It is possible to perform a process of extracting specific salt from the electrolytic solution (desalination process) as well as to produce a chemical substance to be energy. As the desalination process, for example, a process of extracting a specific substance from an electrolytic solution containing at least one of acid salt, basic salt, or normal salt can be performed.

Applications of the above-described desalination process include, for example, production of high-purity chemicals and ultrapure products, treatment and regeneration of plating solution, desalination of foods such as cheese, soy sauce, whey, and fruit juice, desalination of organic acid and amino acid, protein refining, desalination of natural ingredients, desalination, separation, and refining of intermediates of medicine and chemical products, waste molasses treatment, sewage treatment, wastewater water treatment such as ion removal of refuse incineration ash water and desalinated groundwater, production of drinking water, purified water, and common salt from seawater, production of drinking water from sewage, industrial wastewater, agricultural wastewater, and river water, desalination of deep sea water, acid recovery from waste acid, valuable resource recovery such as noble metal recovery, and so on.

The applications are not limited to these, and for example, a process of separating salt into acid and alkali, a process of recovering iron and acid from an iron sulfate solution, and the like can be performed. This makes it possible to extract sulfuric acid and iron from a strongly acid iron sulfate aqueous solution contained in rivers near mountains, for example, and perform a process of river water simultaneously. For example, it is possible to suppress river acidification caused by components (sulfur and the like) contained in wastewater from mines near volcanoes and environmental contamination caused by metal ions.

Further, the chemical substance produced by the oxidation-reduction reaction is not limited to the carbon compounds. For example, it is possible to cause iron sulfate (2+) abundantly present near volcanoes or the like to change into iron sulfate (3+) by the oxidation reaction, and reduce protons by the reduction reaction using electrons obtained by the oxidation reaction to then produce hydrogen. This makes it possible to obtain electrons easily, resulting in that it is possible to facilitate the progress of reduction reaction. Further, the above-described method enables an improvement in reaction efficiency by putting a reductant into the electrolytic solution. As the reductant, for example, a reductant having an oxidation-reduction potential between an oxidation potential of water and a reduction potential of a substance to be reduced can be used.

Structure examples of the components in the electrochemical reaction device 10 illustrated in FIG. 1 to FIG. 3 will be further explained.

As the electrolytic solution containing water applicable to at least one of the electrolytic solution 1a or the electrolytic solution 1b, for example, an aqueous solution containing an arbitrary electrolyte can be used. This solution is preferred to be an aqueous solution accelerating the oxidation reaction of water. Examples of the aqueous solution containing an electrolyte include aqueous solutions containing phosphoric acid ions ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$) and so on.

As the electrolytic solution containing carbon dioxide applicable to at least one of the electrolytic solution 1a or the electrolytic solution 1b, an aqueous solution containing, for example, $LiHCO_3$, $NaHCO_3$, $KHCO_3$, $CsHCO_3$ or the like can be used. The electrolytic solution containing carbon dioxide may contain alcohols such as methanol, ethanol, and acetone. The electrolytic solution containing water may be the same as the electrolytic solution containing carbon dioxide. However, the absorption amount of carbon dioxide in the electrolytic solution containing carbon dioxide is preferred to be high. Accordingly, as the electrolytic solution containing carbon dioxide, a solution different from the electrolytic solution containing water may be used. The electrolytic solution containing carbon dioxide is preferred to be an electrolytic solution that decreases the reduction potential of carbon dioxide, has high ion conductivity, and contains a carbon dioxide absorbent that absorbs carbon dioxide.

As the above-described electrolytic solution, for example, an ionic liquid that is made of a salt of cations such as an imidazolium ion or a pyridinium ion and anions such as $BF_4^-$ or $PF_6^-$ and that is in a liquid state in a wide temperature range, or its aqueous solution can be used. Other examples of the electrolytic solution include amine solutions of ethanolamine, imidazole, pyridine, and the like, or aqueous solutions thereof. Examples of amine include primary amine, secondary amine, tertiary amine, and so on. These electrolytic solutions may have high ion conductivity, have a property of absorbing $CO_2$, and have characteristics of decreasing the reduction energy.

Examples of the primary amine include methylamine, ethylamine, propylamine, butylamine, pentylamine, hexylamine, and so on. Hydrocarbons of the amine may be substituted by alcohol, halogen, or the like. Examples of the amine whose hydrocarbons are substituted include methanolamine, ethanolamine, chloromethyl amine, and so on. Further, an unsaturated bond may exist. These hydrocarbons are the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and so on. The substituted hydrocarbons may be different. This also applies to the tertiary amine. Examples in which the hydrocarbons are different include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, tripropanolamine, triexanolamine, methyldiethylamine, methyldipropylamine, and so on.

Examples of the cation of the ionic liquid include a 1-ethyl-3-methylimidazolium ion, a 1-methyl-3-propylimidazolium ion, a 1-butyl-3-methylimidazole ion, a 1-methyl-3-pentylimidazolium ion, a 1-hexyl-3-methylimidazolium ion, and so on.

A second place of the imidazolium ion may be substituted. Examples of the cation having the imidazolium ion in which second place is substituted include a 1-ethyl-2,3-dimethylimidazolium ion, a 1-2-dimethyl-3-propylimidazolium ion, a 1-butyl-2,3-dimethylimidazolium ion, a 1,2-dimethyl-3-pentylimidazolium ion, a 1-hexyl-2,3-dimethylimidazolium ion, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist.

Examples of the anion include a fluoride ion, a chloride ion, a bromide ion, an iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl)imide, bis(perfluoroethylsulfonyl)imide, and so on. A dipolar ion in which the cation and the anion of the ionic liquid are coupled by hydrocarbons may be used.

Figure 5:
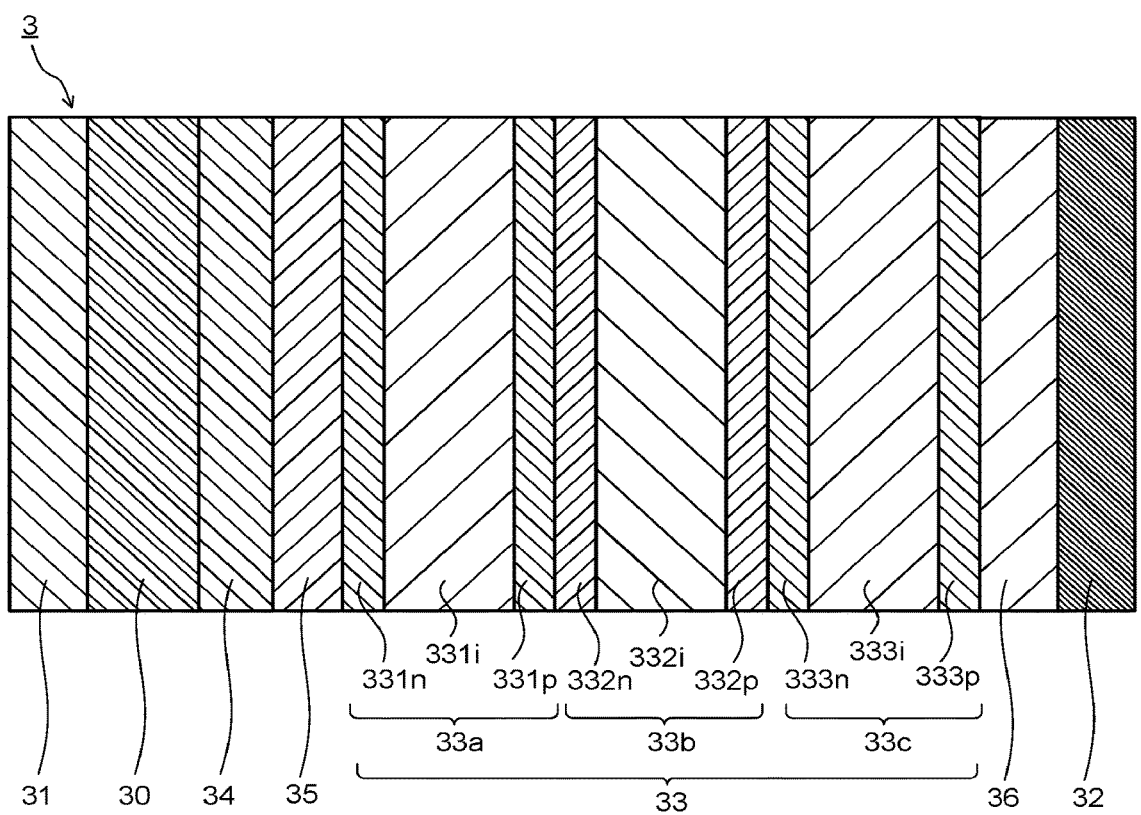
FIG. 5 is a schematic view illustrating a configuration example of a photoelectric conversion cell.

FIG. 5 is a schematic view illustrating a structure example of the photoelectric conversion cell 3. The photoelectric conversion cell 3 illustrated in FIG. 5 includes: the conductive substrate 30; the reduction electrode 31; the oxidation electrode 32; the photoelectric conversion body 33; a light reflector 34; a metal oxide layer 35; and a metal oxide layer 36.

The conductive substrate 30 is in contact with the reduction electrode 31. The conductive substrate 30 may be regarded as one part of the reduction electrode. Examples of the conductive substrate 30 include a substrate containing at least one or a plurality of Cu, Al, Ti, Ni, Fe, and Ag. The conductive substrate 30 is not limited to this, and may be constituted using a conductive resin. The conductive substrate 30 may be constituted using a semiconductor substrate such as Si or Ge. Further, a resin film or the like may be used as the conductive substrate 30. For example, a membrane applicable to the ion exchange membrane 4a or the ion exchange membrane 4b may be used as the conductive substrate 30.

The reduction electrode 31 preferably contains a reduction catalyst. The reduction electrode 31 may contain both a conductive material and a reduction catalyst. Examples of the reduction catalyst include a material that decreases activation energy for reducing carbon dioxide. In other words, the examples include materials that lower overvoltage when a carbon compound is produced by the reduction reaction of carbon dioxide. For example, a metal material or a carbon material can be used. For example, a metal such as gold, aluminum, copper, silver, platinum, palladium, or nickel, or an alloy containing this metal can be used as the metal material. Examples of the carbon material include graphene, carbon nanotube (CNT), fullerene, and ketjen black. The reduction catalyst is not limited to these and, for example, a metal complex such as a Ru complex or a Re complex, or an organic molecule having an imidazole skeleton or a pyridine skeleton may be used as the reduction catalyst. A plurality of materials may be mixed.

The oxidation electrode 32 preferably contains an oxidation catalyst. The oxidation electrode 32 may contain both a conductive material and a oxidation catalyst. Examples of the oxidation catalyst include materials that decrease activation energy for oxidizing water. In other words, the examples include materials that lower overvoltage when oxygen and hydrogen ions are produced by the oxidation reaction of water. For example, iridium, platinum, cobalt, manganese, and so on can be cited. Examples of the oxidation catalyst include a binary metal oxide, a ternary metal oxide, and a quaternary metal oxide. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Co—O, La—Co—O, Ni—La—O, Sr—Fe—O, and so on. Examples of the quaternary metal oxide include Pb—Ru—Ir—O, La—Sr—Co—O, and so on. The oxidation catalyst is not limited to these, and a metal complex such as a Ru complex or a Fe complex can also be used as the oxidation catalyst. Besides, a plurality of materials may be mixed.

At least one of the reduction electrode 31 or the oxidation electrode 32 may have a porous structure. Examples of a material applicable to the electrode layer having a porous structure include carbon blacks such as ketjen black and VULCAN XC-72, activated carbon, metal fine powder, and so on in addition to the above-described materials. The area of an activation surface that contributes to the oxidation-reduction reaction can be made large by having the porous structure, and therefore, the conversion efficiency can be increased.

When an electrode reaction with low current density is performed by using relatively low light irradiation energy in the electrochemical reaction device explained with reference to FIG. 1 to FIG. 5, there are many options in catalyst material. Accordingly, for example, it is easy to perform a reaction by using a ubiquitous metal or the like, and it is also relatively easy to obtain selectivity of the reaction. On the other hand, when the photoelectric conversion body 33 is not provided in the electrolytic solution tank 2 but is connected to at least one of the reduction electrode 31 or the oxidation electrode 32 by wirings or the like, an electrode area generally becomes small for a reason of miniaturizing the electrolytic solution tank 2 or the like, and the reaction is sometimes performed with high current density. In this case, a noble metal is preferably used as the catalyst.

The photoelectric conversion body 33 has a structure in which a photoelectric conversion layer 33a, a photoelectric conversion layer 33b, and a photoelectric conversion layer 33c are stacked. The number of stacked photoelectric conversion layers is not limited to that illustrated in FIG. 5.

The photoelectric conversion layer 33a includes an n-type semiconductor layer 331n made of, for example, n-type amorphous silicon (a-Si), an i-type semiconductor layer 331i made of, for example, intrinsic amorphous silicon germanium (a-SiGe), and a p-type semiconductor layer 331p made of, for example, p-type microcrystal silicon (μc-Si). The i-type semiconductor layer 331i is a layer that absorbs light in a short wavelength region of about 400 nm. Accordingly, charge separation occurs at the photoelectric conversion layer 33a due to the light energy in the short wavelength region.

The photoelectric conversion layer 33b includes an n-type semiconductor layer 332n made of, for example, n-type a-Si, an i-type semiconductor layer 332i made of, for example, intrinsic a-SiGe, and a p-type semiconductor layer 332p made of, for example, p-type μc-Si. The i-type semiconductor layer 332i is a layer that absorbs light in an intermediate wavelength region of about 600 nm. Accordingly, the charge separation occurs at the photoelectric conversion layer 33b due to the light energy in the intermediate wavelength region.

The photoelectric conversion layer 33c includes an n-type semiconductor layer 333n made of, for example, n-type a-Si, an i-type semiconductor layer 333i made of, for example, intrinsic a-Si, and a p-type semiconductor layer 333p made of, for example, p-type μc-Si. The i-type semiconductor layer 333i is a layer that absorbs light in a long wavelength region of about 700 nm. Accordingly, the charge separation occurs at the photoelectric conversion layer 33c due to the light energy in the long wavelength region.

The p-type semiconductor layer or the n-type semiconductor layer can be formed by, for example, adding an element to be donor or acceptor into the semiconductor material. The semiconductor layer containing silicon, germanium, or the like is used as the semiconductor layer in the photoelectric conversion layer, but is not limited to this, and for example, a compound semiconductor layer or the like can be used. As the compound semiconductor layer, for example, a semiconductor layer containing GaAs, GaInP, AlGaInP, CdTe, CuInGaSe, or the like can be used. Besides, a layer containing a material such as $TiO_2$ or $WO_3$ may be used as long as it can perform the photoelectric conversion. Further, each semiconductor layer may be single crystalline, polycrystalline, or amorphous. Besides, a zinc oxide layer may be provided in the photoelectric conversion layer.

The light reflector 34 is between the conductive substrate 30 and the photoelectric conversion body 33. As the light reflector 34, a distribution Bragg reflection layer made of, for example, a stack of metal layers or semiconductor layers can be cited. Providing the light reflector 34 makes it possible to reflect the light that could not be absorbed by the photoelectric conversion body 33, and cause the light to enter any of the photoelectric conversion layer 33a to the photoelectric conversion layer 33c, thereby increasing the conversion efficiency from light to a chemical substance. As the light reflector 34, for example, a layer of a metal such as Ag, Au, Al, or Cu, an alloy containing at least one of these metals, or the like can be used.

The metal oxide layer 35 is between the light reflector 34 and the photoelectric conversion body 33. The metal oxide layer 35 has a function of, for example, adjusting an optical distance to increase the light reflectivity. As the metal oxide layer 35, a material that can come into ohmic-contact with the n-type semiconductor layer 331n is preferably used. As the metal oxide layer 35, for example, a layer of light transmissive metal oxide such as an indium tin oxide (ITO), zinc oxide (ZnO), fluorine-doped tin oxide (FTO), aluminum-doped zinc oxide (AZO), or antimony-doped tin oxide (ATO) can be used.

The metal oxide layer 36 is between the oxidation electrode 32 and the photoelectric conversion body 33. The metal oxide layer 36 has a function as a protective layer that suppresses breakage of the photoelectric conversion cell 3 due to the oxidation reaction. Providing the metal oxide layer 36 makes it possible to suppress corrosion of the photoelectric conversion body 33, and elongate an operating life of the photoelectric conversion cell 3. The metal oxide layer 36 is not necessarily provided.

As the metal oxide layer 36, for example, a dielectric thin film such as $TiO_2$, $ZrO_2$, $Al_2O_3$, $SiO_2$, or $HfO_2$ can be used As the metal oxide layer 36, for example, a layer of light transmissive metal oxide such as an indium tin oxide (ITO), zinc oxide (ZnO), fluorine-doped tin oxide (FTO), aluminum-doped zinc oxide (AZO), or antimony-doped tin oxide (ATO) may be used.

The metal oxide layer 36 may have, for example, a structure in which a metal and a transparent conductive oxide are stacked, a structure in which a metal and another conductive material are complexed, or a structure in which a transparent conductive oxide and another conductive material are complexed. The above structure makes it possible to reduce the number of parts and weight, facilitate manufacture, and reduce the cost. The metal oxide layer 36 may have functions as a protective layer, a conductive layer, and a catalyst layer.

In the photoelectric conversion cell 3 illustrated in FIG. 5, a surface of the n-type semiconductor layer 331n opposite to a contact surface with the i-type semiconductor layer 331i is the first surface of the photoelectric conversion body 33, and a surface of the p-type semiconductor layer 333p opposite to a contact surface with the i-type semiconductor layer 333i is the second surface. As described above, the photoelectric conversion cell 3 illustrated in FIG. 5 includes the stack of the photoelectric conversion layer 33a to the photoelectric conversion layer 33c, to thereby be able to absorb the light in a wide wavelength range of the sunlight and more efficiently utilize the solar energy. At this time, the respective photoelectric conversion layers are connected in series, and therefore high voltage can be obtained.

In the photoelectric conversion cell 3 illustrated in FIG. 5, the electrode layers are stacked on the photoelectric conversion body 33, thereby enabling the oxidation-reduction reaction with higher efficiency than the case of the photoelectric conversion body 33 and the electrode layers being connected by wirings or the like.

The photoelectric conversion cell 3 is not limited to this, and for example, the plural photoelectric conversion layers may be connected in parallel connection. A two-junction or single-layer photoelectric conversion layer may be used. In FIG. 5, the example of the photoelectric conversion body having a stack of three photoelectric conversion layers has been explained. However, the photoelectric conversion body is not limited to this, and may have a stack of two or four or more photoelectric conversion layers. A single photoelectric conversion layer may be used in place of the stack of the plural photoelectric conversion layers. The structure example of the photoelectric conversion cell 3 is explained as described above.

The cation exchange membrane and the anion exchange membrane applicable to at least one of the ion exchange membrane 4a or the ion exchange membrane 4b are appropriately selected according to the characteristics of the electrolytic solution 1a and the electrolytic solution 1b. For example, it is possible to use NEOSEPTA (registered trademark) manufactured by ASTOM Corporation, SELEMION (registered trademark) and Aciplex (registered trademark) manufactured by Asahi Glass Co. Ltd., Fumasep (registered trademark) and fumapem (registered trademark) manufactured by Fumatech GmbH, Nafion (registered trademark), which is a fluorocarbon resin obtained through polymerization of sulfonated tetrafluoroethylene, manufactured by Du Pont, lewabrane (registered trademark) manufactured by LANXESS, IONSEP (registered trademark) manufactured by IONTECH, Mustang (registered trademark) manufactured by Pall Corporation, ralex (registered trademark) manufactured by mega a.s., Gore-Tex (registered trademark) manufactured by W. L. Gore & Associates, or the like. The ion exchange membrane 4a and the ion exchange membrane 4b each may be formed of a film having a hydrocarbon basic skeleton or for anion exchange, may be formed of a film having an amine group. The configuration examples of the components are explained as above.

The electrochemical reaction device according to the embodiment is not limited to the above-described configuration. Other configuration examples of the electrochemical reaction device according to the embodiment are explained with reference to FIG. 6 to FIG. 20. FIG. 6 to FIG. 20 are schematic views illustrating other configuration examples of the electrochemical reaction device. In the electrochemical reaction devices illustrated in FIG. 6 to FIG. 8, the description in FIG. 1 to FIG. 5 can be appropriately cited for the same parts as in the electrochemical reaction device explained with reference to FIG. 1 to FIG. 5.

Figure 6:
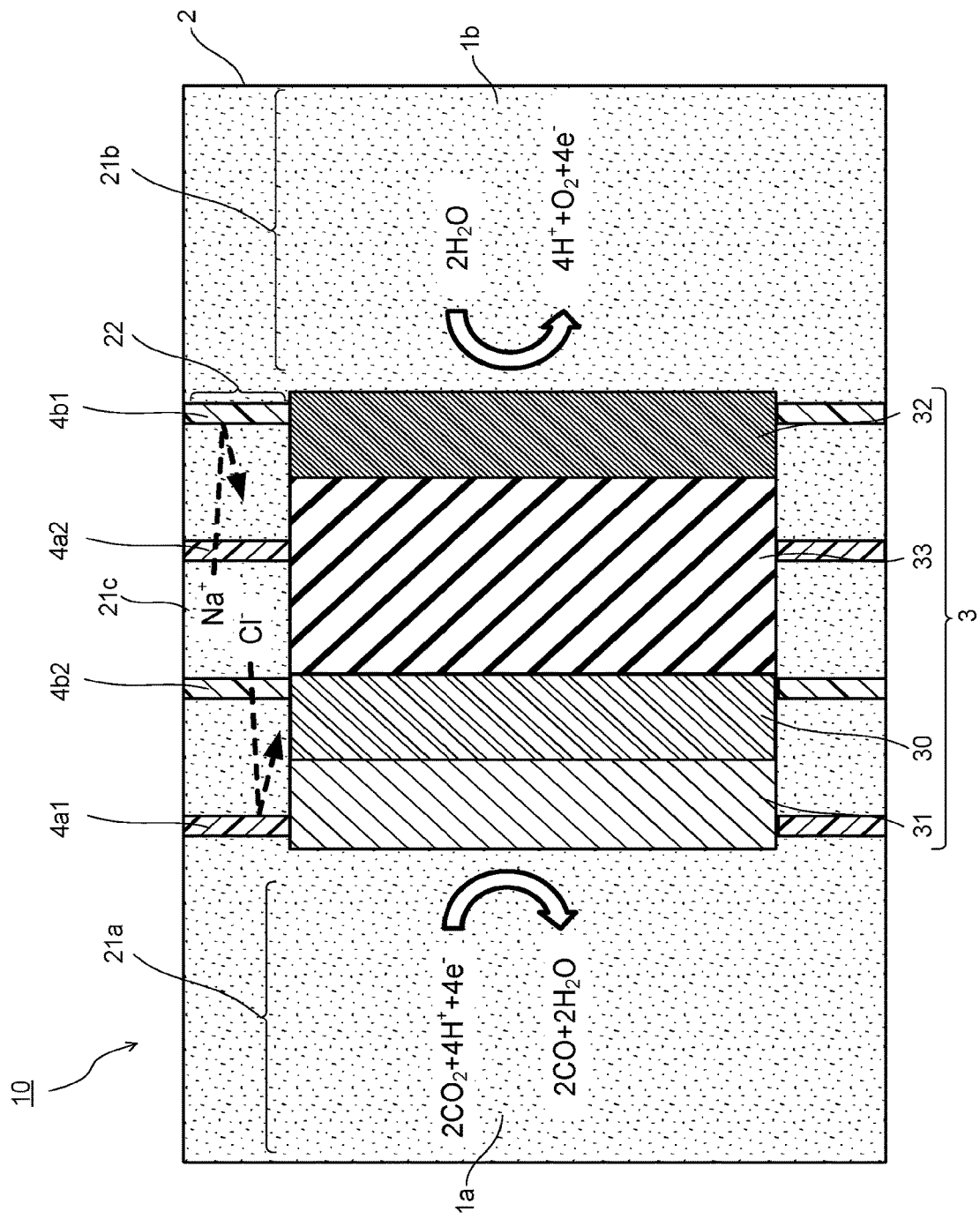
FIG. 6 is a schematic view illustrating another configuration example of the electrochemical reaction device.

The electrochemical reaction device 10 illustrated in FIG. 6 is at least different from the electrochemical reaction device 10 illustrated in FIG. 1 in that as the ion exchange membrane 4a, an ion exchange membrane 4a1 and an ion exchange membrane 4a2 are included, and as the ion exchange membrane 4b, an ion exchange membrane 4b1 and an ion exchange membrane 4b2 are included. Although in FIG. 6, the ion exchange membrane 4a1 is in contact with the reduction electrode 31, the ion exchange membrane 4b2 is in contact with the conductive substrate 30, the ion exchange membrane 4a2 is in contact with the photoelectric conversion body 33, and the ion exchange membrane 4b1 is in contact with the oxidation electrode 32 for convenience, for example, a structure in which the ion exchange membrane 4a1, the ion exchange membrane 4a2, the ion exchange membrane 4b1, and the ion exchange membrane 4b2 are all in contact with the conductive substrate 30 may be employed.

The ion exchange membrane 4a1 and the ion exchange membrane 4a2 have at least the cation exchange membrane. The ion exchange membrane 4b1 and the ion exchange membrane 4b2 have at least the anion exchange membrane.

The ion exchange membrane 4a2 is between the ion exchange membrane 4a1 and the ion exchange membrane 4b1. The ion exchange membrane 4b2 is between the ion exchange membrane 4a1 and the ion exchange membrane 4a2. The ion exchange membrane 4a1 and the ion exchange membrane 4a2 have a function of hindering at least one kind of anion, which is contained in at least one of the electrolytic solution 1a or the electrolytic solution 1b, from passing therethrough. The ion exchange membrane 4b1 and the ion exchange membrane 4b2 have a function of hindering at least one kind of cation, which is contained in at least one of the electrolytic solution 1a or the electrolytic solution 1b, from passing therethrough.

An operation example of the electrochemical reaction device 10 illustrated in FIG. 6 is explained. Here, a case of using, as one example of the electrolytic solution 1a and the electrolytic solution 1b, an electrolytic solution containing water, carbon dioxide, and sodium chloride to produce carbon monoxide is explained. In the electrochemical reaction device 10 illustrated in FIG. 6, chemical substances are produced by the oxidation-reduction reaction expressed by the formula (1) and the formula (2) in the same manner as in the electrochemical reaction device 10 illustrated in FIG. 1.

In this case, cations such as sodium ions ($Na^+$) contained in the electrolytic solution 1a and the electrolytic solution 1b pass through the ion exchange membrane 4a1 and the ion exchange membrane 4a2, and are hindered from passing through the ion exchange membrane 4b1 and the ion exchange membrane 4b2. Anions such as chloride ions ($Cl^-$) pass through the ion exchange membrane 4b1 and the ion exchange membrane 4b2, and are hindered from passing through the ion exchange membrane 4a1 and the ion exchange membrane 4a2. This makes it possible to prevent anions such as chloride ions contained in the electrolytic solution 1a from migrating to the second electrolytic solution region 21b and to prevent cations such as sodium ions contained in the electrolytic solution 1b from migrating to the first electrolytic solution regions 21a, for example. This makes it possible to suppress a reduction in catalytic performance caused by the ions not contributing to the oxidation reaction or the reduction reaction. Further, it is also possible to use an aqueous solution of hydrochloric acid as the electrolytic solution between the ion exchange membrane 4a1 and the ion exchange membrane 4b2 to then produce hydrochloric acid from a liquid containing sodium chloride such as seawater. Further, it is possible to use an aqueous solution of sodium hydroxide as the electrolytic solution between the ion exchange membrane 4a2 and the ion exchange membrane 4b1 and make the electrochemical reaction device function as a device to produce an aqueous sodium hydroxide solution. The electrochemical reaction device is not limited to this, and for example, can also extract chemical energies such as hydrogen and CO by means of renewable energy, and simultaneously produce effective chemicals such as hydrochloric acid and sodium hydroxide.

As illustrated in FIG. 6, the ion exchange membranes 4a are provided alternately and the ion exchange membranes 4b are provided alternately, thereby making it possible to further enhance ion selectivity and use, as the electrolytic solution, a solution containing ions not contributing to the oxidation reaction or the reduction reaction such as, for example, seawater containing a lot of impurities, industrial wastewater, or agricultural wastewater. In this case, for example, a supply flow path may be provided at the electrolytic solution tank 2 and the electrolytic solution may be directly supplied into the third electrolytic solution region 21c therethrough.

Figure 7:
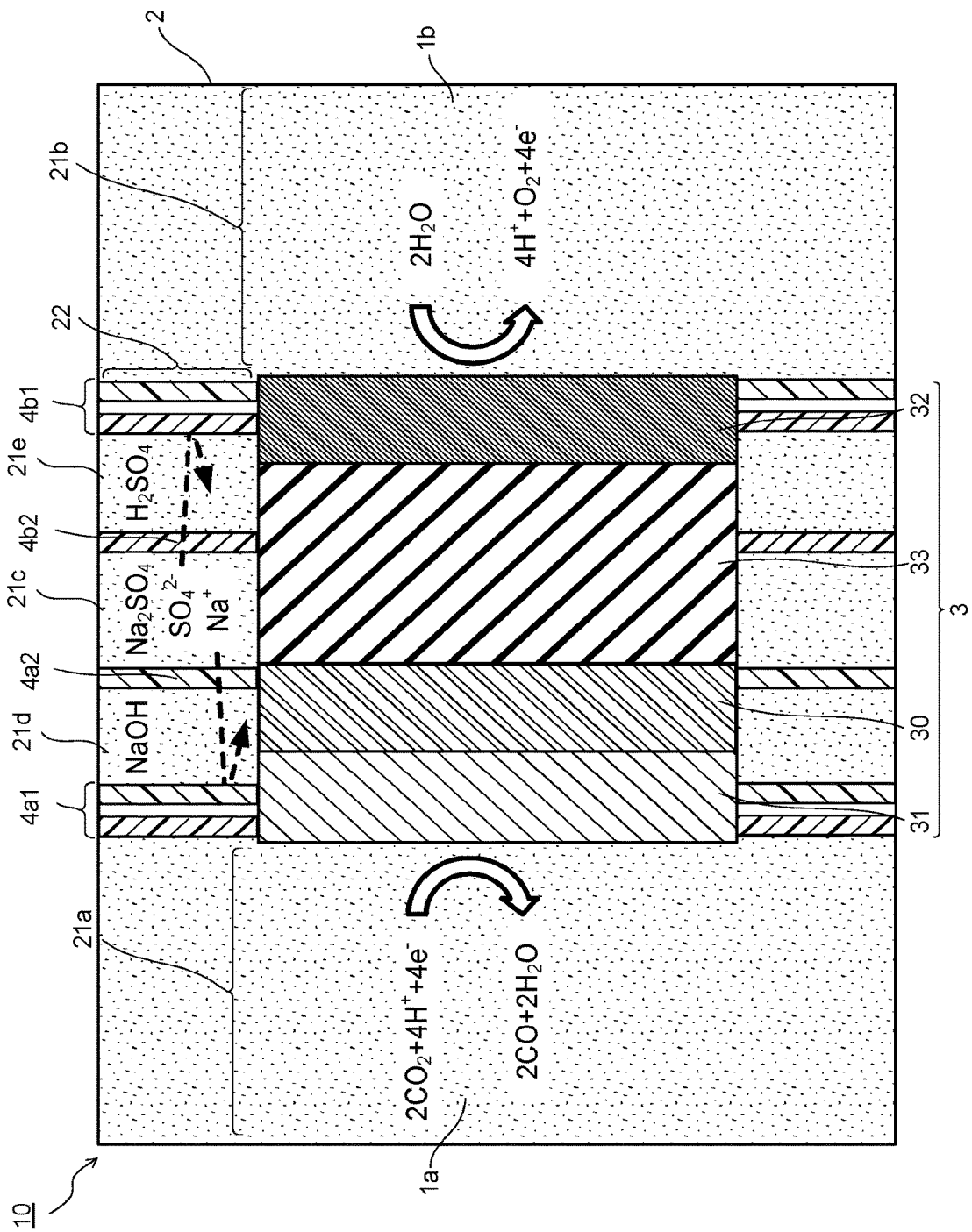
FIG. 7 is a schematic view illustrating another configuration example of the electrochemical reaction device.

The electrochemical reaction device 10 illustrated in FIG. 7 is at least different from the electrochemical reaction device 10 illustrated in FIG. 6 in that a bipolar membrane is used as the ion exchange membrane 4a1 and the ion exchange membrane 4b1. As illustrated in FIG. 7, a bipolar membrane is preferably used for the ion exchange membrane 4a1 in contact with the first electrolytic solution region 21a and for the ion exchange membrane 4b1 in contact with the second electrolytic solution region 21b. The ion exchange membrane 4a2 is between the ion exchange membrane 4a1 and the ion exchange membrane 4b1, and the ion exchange membrane 4b2 is between the ion exchange membrane 4b1 and the ion exchange membrane 4a2.

Further, the electrolytic solution tank 2 illustrated in FIG. 7 includes: the third electrolytic solution region 21c provided between the ion exchange membrane 4a2 and the ion exchange membrane 4b2; a fourth electrolytic solution region 21d provided between the ion exchange membrane 4a1 and the ion exchange membrane 4a2; and a fifth electrolytic solution region 21e provided between the ion exchange membrane 4b1 and the ion exchange membrane 4b2.

There is explained an example of performing a desalination process by means of the electrochemical reaction device 10 illustrated in FIG. 7. In the electrochemical reaction device 10 illustrated in FIG. 7, an electrolytic solution containing water and carbon dioxide is used as one example of the electrolytic solution 1a and the electrolytic solution 1b, and a sodium sulfate solution is supplied into the third electrolytic solution region 21c. In the electrochemical reaction device 10 illustrated in FIG. 7, chemical substances are produced by the oxidation-reduction reaction expressed by the formula (1) and the formula (2) in the same manner as in the electrochemical reaction device 10 illustrated in FIG. 1.

In this case, cations such as sodium ions ($Na^+$) contained in the third electrolytic solution region 21c pass through the ion exchange membrane 4a2, but are hindered by the ion exchange membrane 4a1 from migrating to the first electrolytic solution region 21a side and hindered by the ion exchange membrane 4b2 from migrating to the second electrolytic solution region 21b side. Further, anions such as sulfide ions ($SO_4^{2-}$) pass through the ion exchange membrane 4b2, but are hindered by the ion exchange membrane 4b1 from migrating to the second electrolytic solution region 21b side and hindered by the ion exchange membrane 4a1 from migrating to the first electrolytic solution region 21a side.

In the fourth electrolytic solution region 21d, the sodium ions and the hydroxide ions react with each other to produce sodium hydroxide. Thereby, the concentration of sodium hydroxide increases in the fourth electrolytic solution region 21d. On the other hand, in the fifth electrolytic solution region 21e, the sulfide ions and the hydrogen ions react with each other to produce sulfuric acid. Thereby, the concentration of sulfuric acid increases in the fifth electrolytic solution region 21e. In this manner, the desalination process that extracts sodium hydroxide and sulfuric acid from the sodium sulfate solution can be performed. A recovery path may be provided at the electrolytic solution tank 2 and obtained substances may be recovered therethrough.

Figure 8:
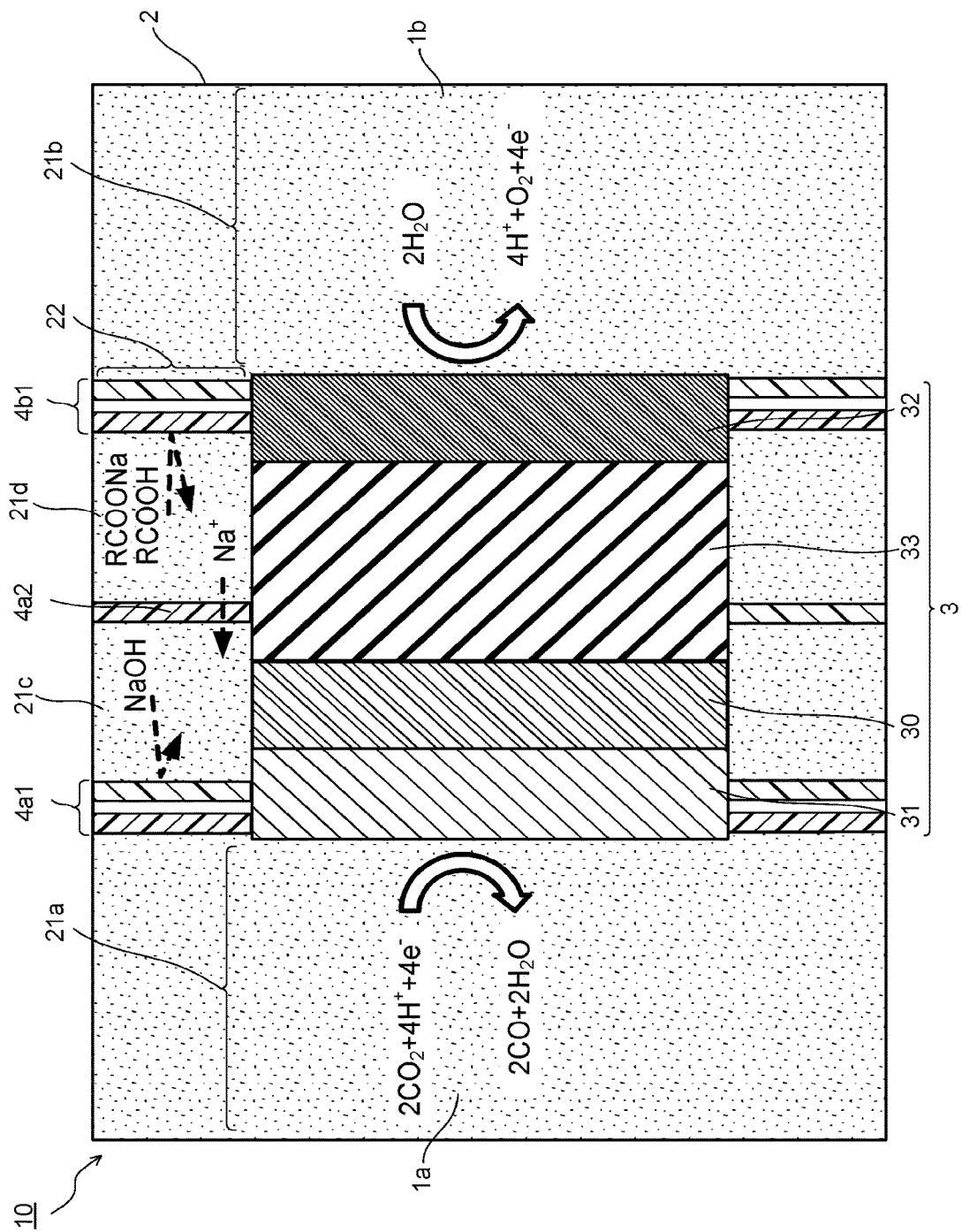
FIG. 8 is a schematic view illustrating another configuration example of the electrochemical reaction device.

The electrochemical reaction device 10 illustrated in FIG. 8 is at least different from the electrochemical reaction device 10 illustrated in FIG. 7 in that the ion exchange membrane 4b2 is not provided.

There is explained an example of performing a desalination process by means of the electrochemical reaction device 10 illustrated in FIG. 8. In the electrochemical reaction device 10 illustrated in FIG. 8, an electrolytic solution containing water and carbon dioxide is used as one example of the electrolytic solution 1a and the electrolytic solution 1b, and a solution containing sodium organic acid salt is supplied into the fourth electrolytic solution region 21d. In the electrochemical reaction device 10 illustrated in FIG. 8, chemical substances are produced by the oxidation-reduction reaction expressed by the formula (1) and the formula (2) in the same manner as in the electrochemical reaction device 10 illustrated in FIG. 1.

In this case, cations such as sodium ions ($Na^+$) contained in the fourth electrolytic solution region 21d pass through the ion exchange membrane 4a2, but are hindered by the ion exchange membrane 4a1 from migrating to the first electrolytic solution region 21a side and hindered by the ion exchange membrane 4b1 from migrating to the second electrolytic solution region 21b side. Further, anions such as organic acid ions ($RCOO^-$) are hindered by the ion exchange membrane 4a2 from migrating to the first electrolytic solution region 21a side, and hindered by the ion exchange membrane 4b1 from migrating to the second electrolytic solution region 21b side.

In the third electrolytic solution region 21c, the sodium ions and the hydroxide ions react with each other to produce sodium hydroxide. Thereby, the concentration of sodium hydroxide increases in the third electrolytic solution region 21c. On the other hand, in the fourth electrolytic solution region 21d, the organic acid ions and the hydrogen ions react with each other to produce organic acid. Thereby, the concentration of organic acid increases in the fourth electrolytic solution region 21d. In this manner, the desalination process that extracts sodium hydroxide and organic acid from the organic acid sodium solution can be performed. A recovery path may be provided at the electrolytic solution tank 2 and obtained substances may be recovered therethrough.

Figure 9:
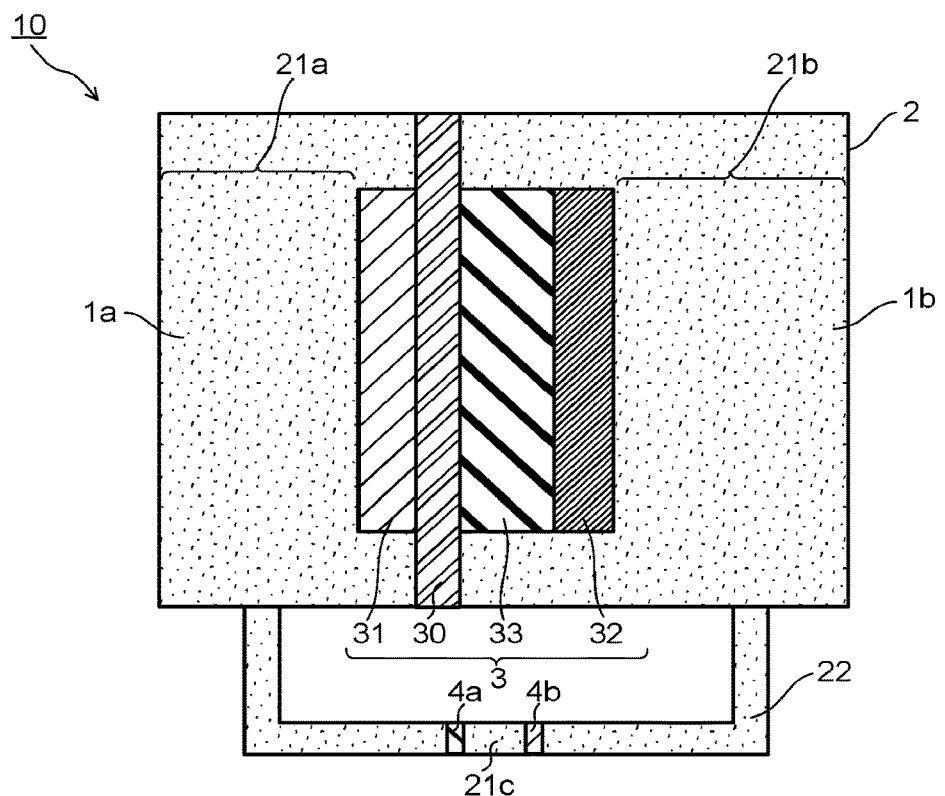
FIG. 9 is a schematic view illustrating another configuration example of the electrochemical reaction device.

The electrochemical reaction device 10 illustrated in FIG. 9 is at least different from the electrochemical reaction device 10 illustrated in FIG. 1 in that an electrolytic solution tank 2 including an ion migration path 22 having a pipe-shaped structure is included. In this case, the conductive substrate 30 separates the electrolytic solution 1a and the electrolytic solution 1b. The ion exchange membrane 4a and the ion exchange membrane 4b partition the ion migration path 22.

Figure 10:
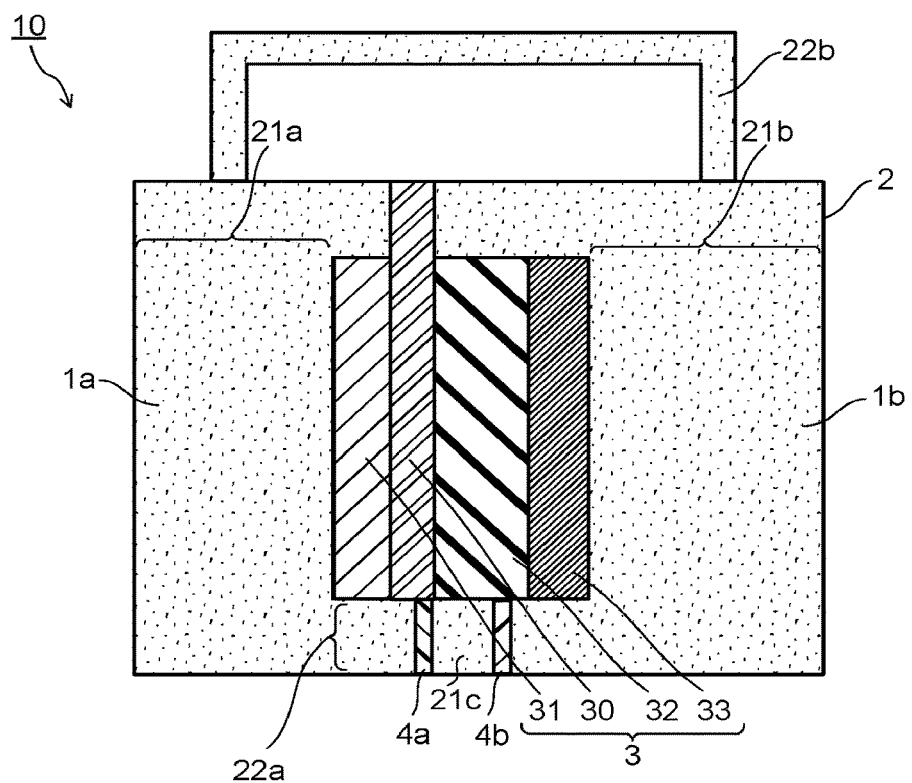
FIG. 10 is a schematic view illustrating another configuration example of the electrochemical reaction device.

The electrochemical reaction device 10 illustrated in FIG. 10 is at least different from the electrochemical reaction device 10 illustrated in FIG. 1 in that an electrolytic solution tank 2 including an ion migration path 22a and an ion migration path 22b each formed of the ion migration path 22 is included. The ion migration path 22b has a function of connecting the first electrolytic solution region 21a and the second electrolytic solution region 21b. Providing the ion migration path 22b makes it possible to suppress a decrease in cations contributing to the reduction reaction in the first electrolytic solution region 21a and suppress a decrease in anions contributing to the oxidation reaction in the second electrolytic solution region 21b.

Figure 11:
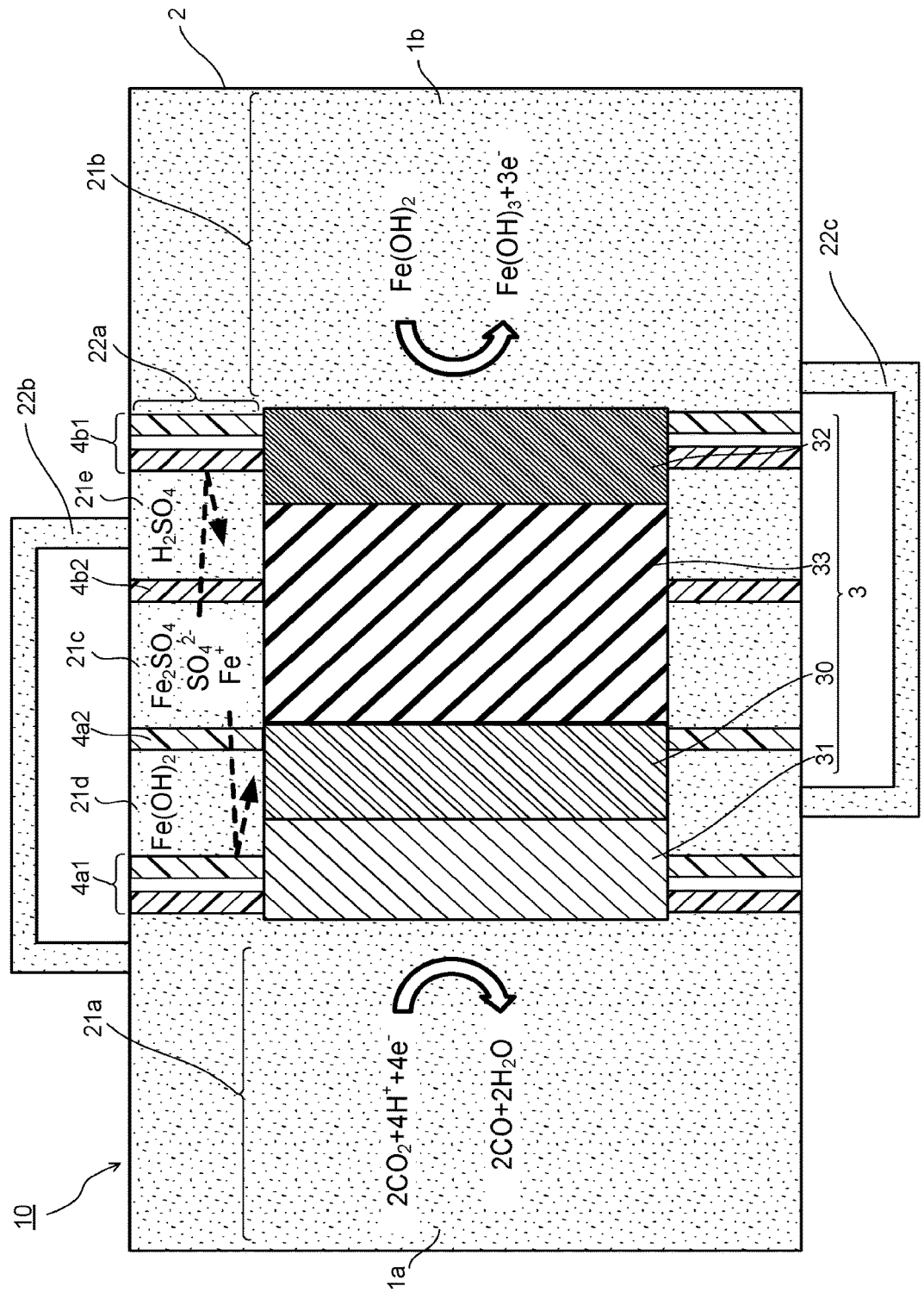
FIG. 11 is a schematic view illustrating a configuration example of the electrochemical reaction device.

The electrochemical reaction device 10 illustrated in FIG. 11 is at least different from the electrochemical reaction device 10 illustrated in FIG. 1 in that an electrolytic solution tank 2 including the ion migration path 22a formed of the ion migration path 22, an ion migration path 22b having a pipe-shaped structure, and an ion migration path 22c having a pipe-shaped structure is included. The ion migration path 22b connects the first electrolytic solution region 21a and the fifth electrolytic solution region 21e. The ion migration path 22c connects the second electrolytic solution region 21b and the fourth electrolytic solution region 21d.

The above-described configuration may enable supply of alkali components recovered in the fourth electrolytic solution region 21d to the second electrolytic solution region 21b, for example. Further, the above-described configuration may enable supply of acid components recovered in the fifth electrolytic solution region 21e to the first electrolytic solution region 21a. The above-described configuration is not limited to this, and for example, the ion migration path 22b may connect the fifth electrolytic solution region 21e to another electrochemical reaction device, and the ion migration path 22c may connect the fourth electrolytic solution region 21d to another electrochemical reaction device.

There is explained an example of performing a desalination process by means of the electrochemical reaction device 10 illustrated in FIG. 11. In the electrochemical reaction device 10 illustrated in FIG. 11, an electrolytic solution containing water and carbon dioxide is used as one example of the electrolytic solution 1a and the electrolytic solution 1b, and a solution containing iron sulfate is supplied into the third electrolytic solution region 21c. In the electrochemical reaction device 10 illustrated in FIG. 11, chemical substances are produced by the oxidation-reduction reaction expressed by the formula (1) and the formula (2) in the same manner as in the electrochemical reaction device 10 illustrated in FIG. 1.

In this case, cations such as iron ions ($Fe^+$) contained in the third electrolytic solution region 21c pass through the ion exchange membrane 4a2, but are hindered by the ion exchange membrane 4a1 from migrating to the first electrolytic solution region 21a side and hindered by the ion exchange membrane 4b2 from migrating to the second electrolytic solution region 21b side. Further, anions such as sulfate ions ($SO_4^{2-}$) pass through the ion exchange membrane 4b2, but are hindered by the ion exchange membrane 4a2 from migrating to the first electrolytic solution region 21a side and hindered by the ion exchange membrane 4b1 from migrating to the second electrolytic solution region 21b side.

In the fourth electrolytic solution region 21d, the iron ions and the hydroxide ions react with each other to produce iron hydroxide. Thereby, the concentration of iron hydroxide increases in the fourth electrolytic solution region 21d. On the other hand, in the fifth electrolytic solution region 21e, the sulfate ions and the hydrogen ions react with each other to produce sulfuric acid. Thereby, the concentration of sulfuric acid increases in the fifth electrolytic solution region 21e. In this manner, the desalination process that extracts iron hydroxide and sulfuric acid from the iron sulfate solution can be performed. This enables, for example, impurities of river water to be removed. A recovery path may be provided at the electrolytic solution tank 2 and obtained substances may be recovered therethrough.

Figure 12:
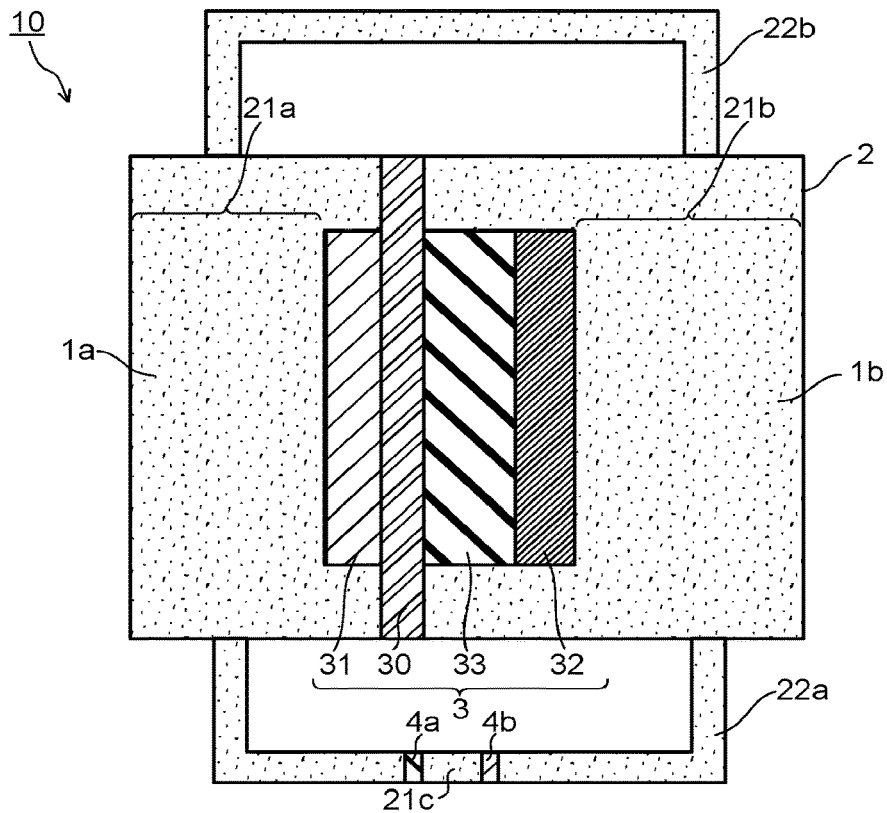
FIG. 12 is a schematic view illustrating a configuration example of the electrochemical reaction device.

The electrochemical reaction device 10 illustrated in FIG. 12 is at least different from the electrochemical reaction device 10 illustrated in FIG. 9 in that an electrolytic solution tank 2 including the ion migration path 22a formed of the ion migration path 22 and the ion migration path 22b having a pipe-shaped structure is included. The ion migration path 22a has the same function as that of the ion migration path 22 illustrated in FIG. 9, and thus its explanation is omitted.

The ion migration path 22b has the same function as that of the ion migration path 22b illustrated in FIG. 10, and thus its explanation is omitted.

Figure 13:
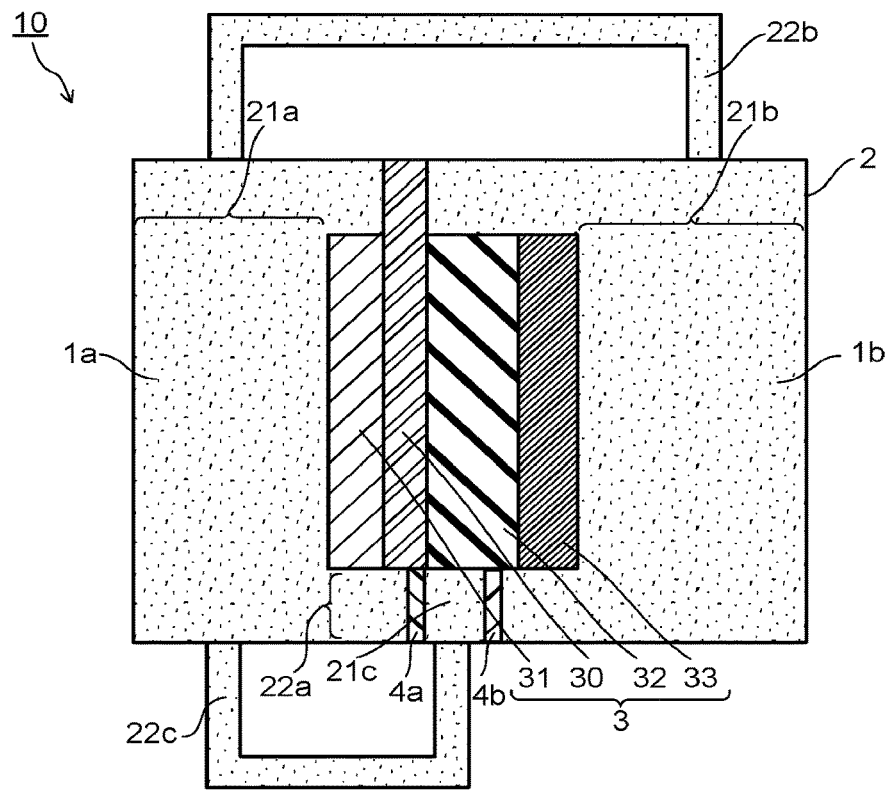
FIG. 13 is a schematic view illustrating another configuration example of the electrochemical reaction device.

The electrochemical reaction device 10 illustrated in FIG. 13 is at least different from the electrochemical reaction device 10 illustrated in FIG. 10 in that an electrolytic solution tank 2 including the ion migration path 22c is included. The ion migration path 22c connects the first electrolytic solution region 21a and the third electrolytic solution region 21c. The electrochemical reaction device 10 is not limited to this, and the ion migration path 22c may connect the second electrolytic solution region 21b and the third electrolytic solution region 21c. This enables an increase in efficiency of the oxidation-reduction reaction.

Figure 14:
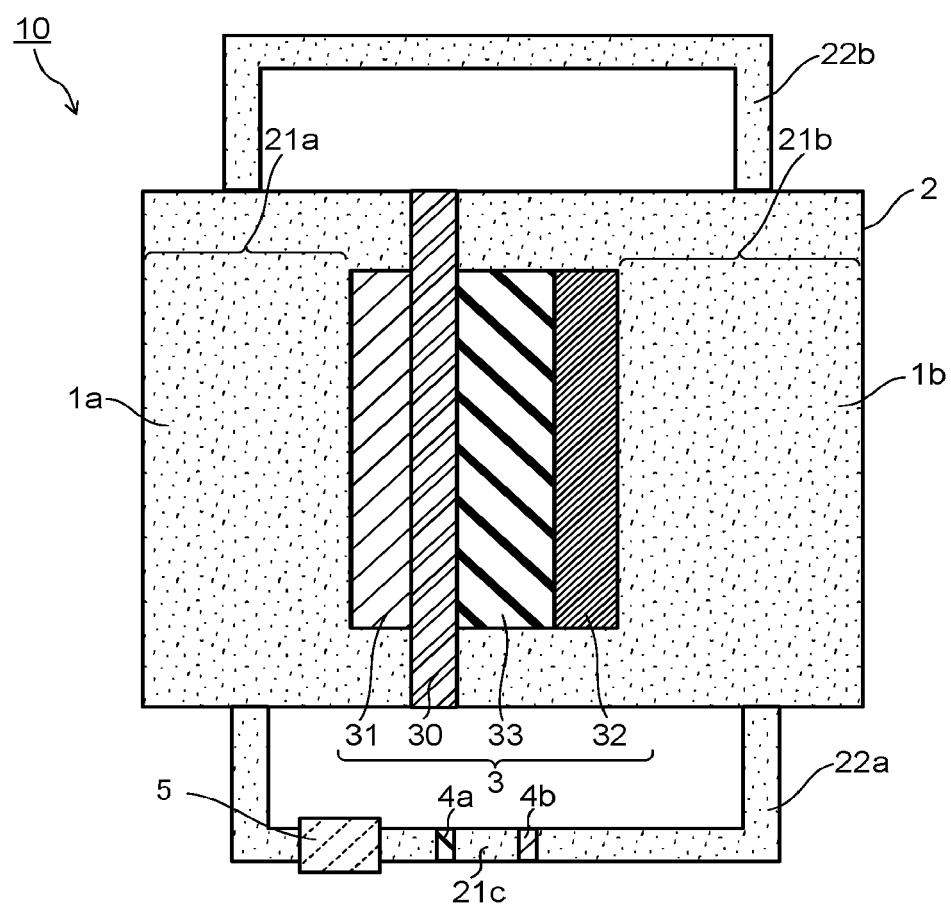
FIG. 14 is a schematic view illustrating an operation example of the electrochemical reaction device.

The electrochemical reaction device 10 illustrated in FIG. 14 is at least different from the electrochemical reaction device 10 illustrated in FIG. 12 in that a circulating pump 5 is included. The circulating pump 5 is at the ion migration path 22a. Further, the circulating pump may be provided also at the ion migration path 22b. The circulating pump 5 may cause the electrolytic solution in the ion migration path 22a to flow in a direction from, for example, the first electrolytic solution region 21a to the second electrolytic solution region 21b, and may cause the electrolytic solution in the ion migration path 22b to flow in a direction from, for example, the second electrolytic solution region 21b to the first electrolytic solution region 21a. In this case, the ion exchange membrane 4a and the ion exchange membrane 4b do not need to have a membrane shape.

Figure 15:
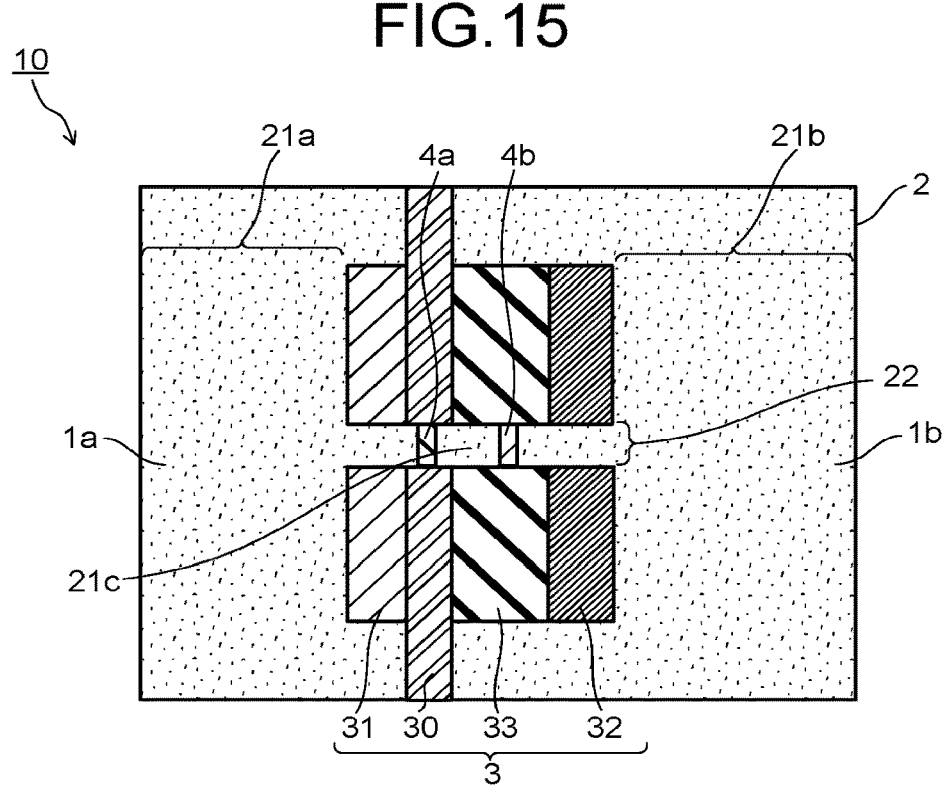
FIG. 15 is a schematic view illustrating another configuration example of the electrochemical reaction device.

The electrochemical reaction device 10 illustrated in FIG. 15 is at least different from the electrochemical reaction device 10 illustrated in FIG. 9 in that an ion migration path 22 formed of a through hole that penetrates through the photoelectric conversion cell 3 is included in place of the ion migration path 22 having a pipe-shaped structure. In this case, the ion exchange membrane 4a and the ion exchange membrane 4b block the ion migration path 22 formed of a through hole.

Figure 16:
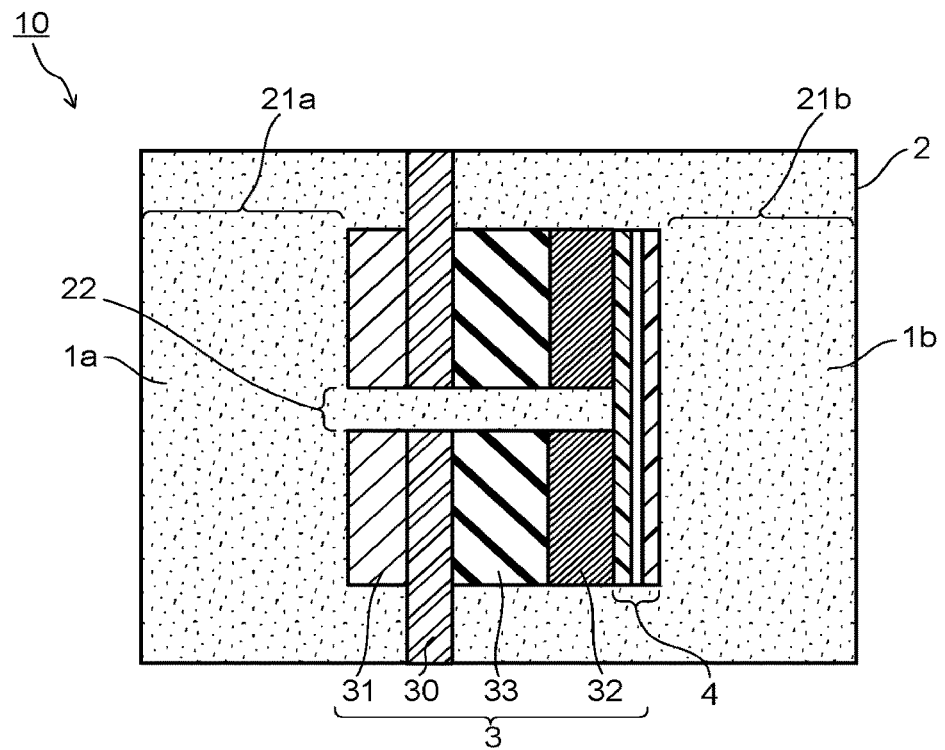
FIG. 16 is a schematic view illustrating another configuration example of the electrochemical reaction device.

Further, as illustrated in FIG. 16, a bipolar membrane 4 may be provided to come into contact with at least one of the reduction electrode 31 or the oxidation electrode 32. The electrochemical reaction device 10 is not limited to this, and the ion exchange membrane 4a and the ion exchange membrane 4b may be provided separately in place of the bipolar membrane 4.

Figure 17:
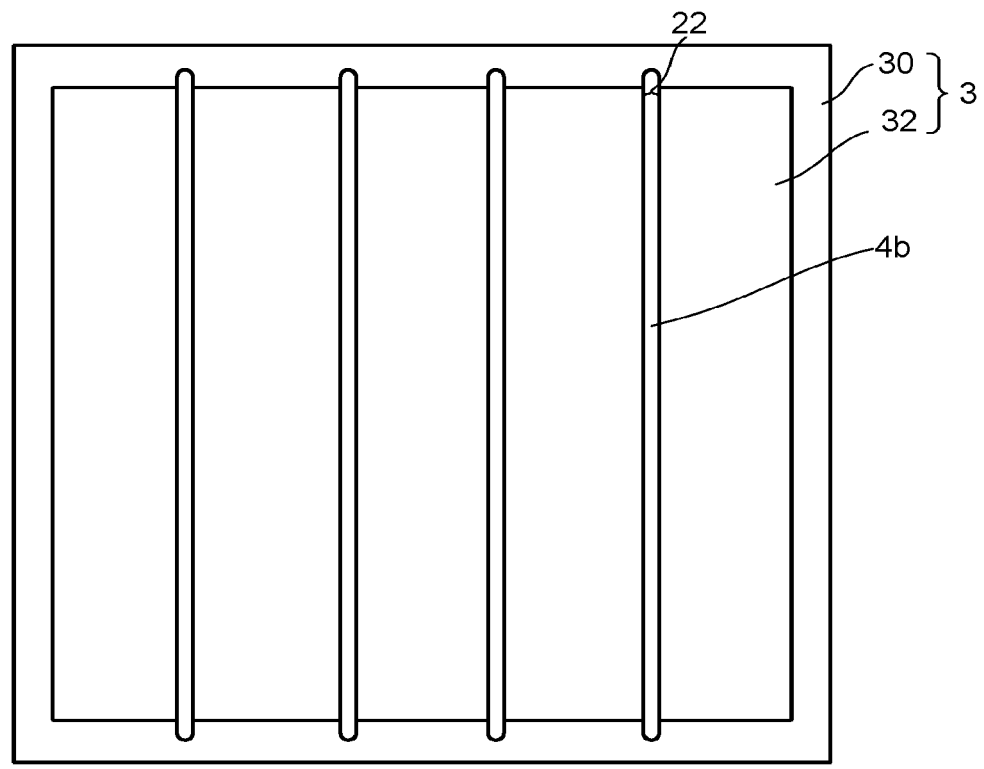
FIG. 17 is a schematic view illustrating a configuration example of an ion migration path formed of a through hole.
Figure 18:
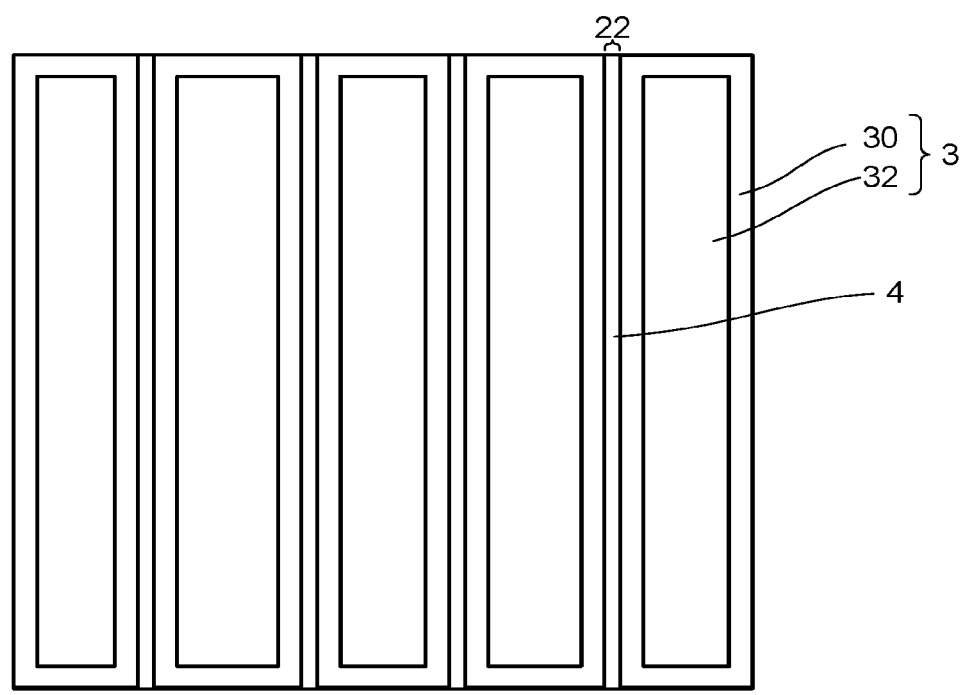
FIG. 18 is a schematic view illustrating a configuration example of the ion migration path formed of a through hole.

FIG. 17 and FIG. 18 are schematic views each illustrating a configuration example of the ion migration path 22 formed of a through hole. For example, as illustrated in FIG. 17, the ion migration paths 22 each formed of a through hole may be provided in a slit shape in the photoelectric conversion cell 3. In this case, the ion exchange membrane 4a and the ion exchange membrane 4b are provided inside the ion migration path 22 in a slit shape. Further, as illustrated in FIG. 18, the ion migration paths 22 each formed of a through hole may be provided to divide the photoelectric conversion cell 3. In this case, the photoelectric conversion cell 3 is preferably supported by the ion exchange membrane 4a and the ion exchange membrane 4b.

The ion migration path 22 formed of a through hole is formed by removing one portion of the photoelectric conversion cell 3 by etching or the like, for example. The ion migration path 22 formed of a through hole may be formed by a plurality of opening processes.

Figure 19:
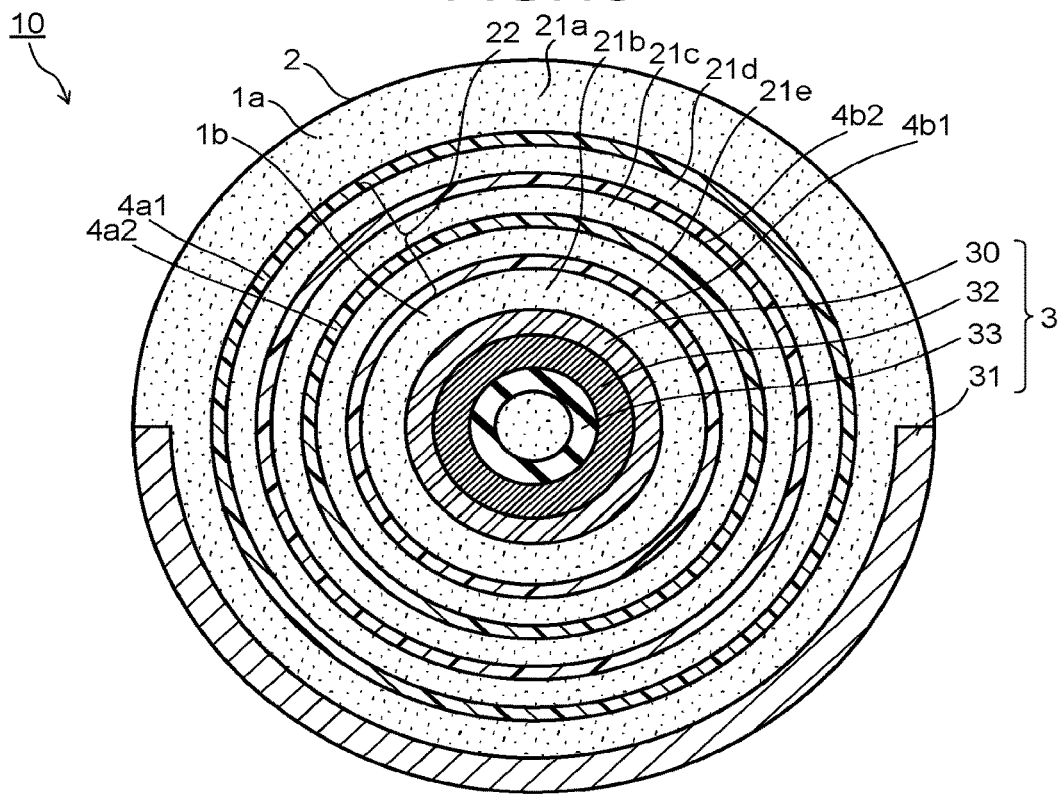
FIG. 19 is a schematic view illustrating another configuration example of the electrochemical reaction device.
Figure 20:
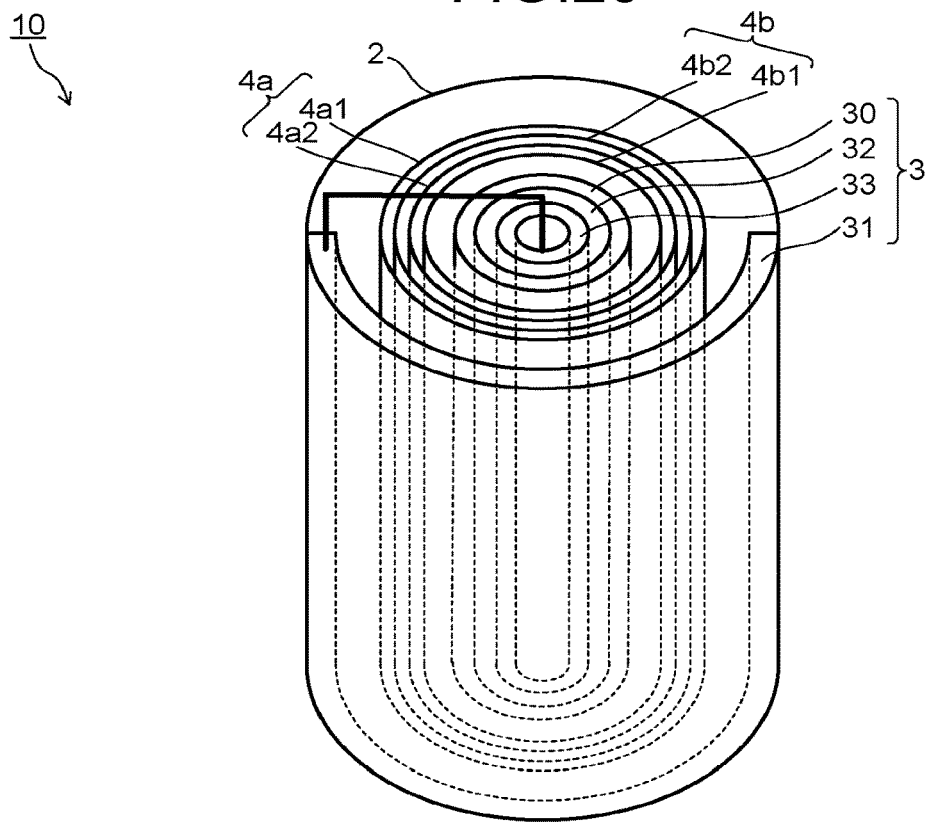
FIG. 20 is an external appearance schematic view illustrating the configuration example of the electrochemical reaction device.

FIG. 19 is a cross section schematic view illustrating a configuration example of the electrochemical reaction device, and FIG. 20 is an external appearance schematic view illustrating a structure example of the electrochemical reaction device. The electrochemical reaction device 10 illustrated in FIG. 19 and FIG. 20 is at least different from the electrochemical reaction device 10 illustrated in FIG. 1 in that an electrolytic solution tank 2 having a pipe-shaped structure is included, as the ion exchange membrane 4a, the ion exchange membrane 4a1 and the ion exchange membrane 4a2 are included, and as the ion exchange membrane 4b, the ion exchange membrane 4b1 and the ion exchange membrane 4b2 are included.

The electrolytic solution tank 2 has a pipe-shaped structure, but does not necessarily need to have a perfect circular shape in a radial direction of a pipe. The electrolytic solution tank 2 may be formed of, for example, a transparent glass or resin. This makes it possible to focus light onto the photoelectric conversion body 33 using light refraction. Further, manufacture and installation are facilitated, thereby making it possible to suppress the cost easily. Further, providing a light reflection member on an outer periphery of the electrolytic solution tank 2 also enables light to be focused onto the photoelectric conversion body 33. In this case, the light reflection member is formed of a catalyst having a light reflecting function, thereby making it possible to simplify the structure. In this case, it is also possible to employ a configuration in which light focusing is caused by a difference in refractive index between the outside and the inside of a pipe without disposing the photoelectric conversion body 33 in the center.

The conductive substrate 30 has a pipe-shaped structure, for example. The conductive substrate 30 does not necessarily need to have a perfect circular shape in the radial direction.

The reduction electrode 31 is provided along at least one portion of the inner periphery of the electrolytic solution tank 2. The reduction electrode 31 is supported by the electrolytic solution tank 2. The reduction electrode 31 having a pipe-shaped structure may be provided along the inner periphery of the electrolytic solution tank 2.

The oxidation electrode 32 is provided along at least one portion of the inner periphery of the conductive substrate 30. The oxidation electrode 32 has a pipe-shaped structure, for example. The oxidation electrode 32 does not necessarily need to have a perfect circular shape in the radial direction.

The photoelectric conversion body 33 is along at least one portion of the inner periphery of the oxidation electrode 32. The photoelectric conversion body 33 has a pipe-shaped structure, for example. In this case, the first surface of the photoelectric conversion body 33 is connected to the reduction electrode 31 via wirings or the like. The photoelectric conversion body 33 does not necessarily need to have a perfect circular shape in the radial direction.

The ion exchange membrane 4a1, the ion exchange membrane 4a2, the ion exchange membrane 4b1, and the ion exchange membrane 4b2 separate the first electrolytic solution region 21a (electrolytic solution 1a) and the second electrolytic solution region 21b (electrolytic solution 1b). The ion exchange membrane 4a2 is between the ion exchange membrane 4b1 and the ion exchange membrane 4b2. The ion exchange membrane 4b2 is between the ion exchange membrane 4a1 and the ion exchange membrane 4a2. The number of ion exchange membranes and the order of ion exchange membranes are not limited to this.

The first electrolytic solution region 21a surrounds the second electrolytic solution region 21b along the inner periphery of the electrolytic solution tank 2 having a pipe-shaped structure. The electrochemical reaction device 10 is not limited to this, and the first electrolytic solution region 21a may be provided to surround the second electrolytic solution region 21b along the inner periphery of the electrolytic solution tank 2 having a pipe-shaped structure. In this case, the reduction electrode 31 is at the inner periphery rather than the oxidation electrode 32 and the photoelectric conversion body 33.

The configuration including the electrolytic solution tank 2 having a pipe-shaped structure facilitates flow of the electrolytic solution. This makes it possible to perform the oxidation-reduction reaction efficiently, resulting in that it is possible to increase the conversion efficiency from light to a chemical substance.

The electrochemical reaction device according to this embodiment is not limited to the configurations explained with reference to FIG. 1 to FIG. 20. For example, a temperature gradient may be provided in the electrolytic solution by means of heat generated by light irradiating the photoelectric conversion cell 3. This causes a convection in the electrolytic solution tank 2, thereby making it possible to automatically circulate the electrolytic solution and suppress an effect of diffusion. Further, it is also possible to uniformize the temperature of the electrolytic solution in order to stabilize the performance of the photoelectric conversion cell 3. Further, by providing a heater and a cooler in the electrolytic solution tank 2, the temperature of the electrolytic solution is controlled. Consequently, the performance of the photoelectric conversion cell 3 improves to enable an increase in reaction efficiency. Further, by preventing a temperature increase, the system of the electrochemical reaction device 10 is stabilized. By changing selectivity according to the performance of the photoelectric conversion cell 3 and the temperature of a catalyst, products can also be controlled.

It is possible to configure a photoelectric conversion module by using one or more of the above-described electrochemical reaction devices. For example, since little substance only needs to be supplied to a large area because of low energy by the sunlight, a system in which a module having an area of over 1 m$^2$ and a plurality of electrochemical reaction devices are coupled by a supply flow path, or a system in which at least an oxidation catalyst layer and a reduction catalyst layer are provided in a supply flow path in a pipe shape may be used. In this case, a heater and a temperature sensor may be provided at one portion of the supply flow path.

Parts of the electrochemical reaction devices 10 illustrated in FIG. 1 to FIG. 20 can be appropriately substituted with each other. Further, at least parts of the electrochemical reaction devices 10 illustrated in FIG. 1 to FIG. 20 can be appropriately combined with each other.

It should be noted that the embodiments have been presented by way of example only, and are not intended to limit the scope of the inventions. These embodiments may be embodied in a variety of other forms, and various omissions, substitutions and changes may be made without departing from the spirit of the inventions. These embodiments and modifications thereof are included in the scope and spirit of the inventions and included in the inventions described in the claims and their equivalents.

What is claimed is:

1. An electrochemical reaction device, comprising:
   an electrolytic solution tank including a first region to store a first electrolytic solution containing a first substance comprising carbon dioxide, a second region to store a second electrolytic solution containing a second substance comprising water, and a path connecting the first region and the second region;
   a reduction electrode disposed in the first region;
   an oxidation electrode disposed in the second region;
   a power source connected to the reduction and oxidation electrodes; and
   a plurality of ion exchange membranes disposed in the path to separate the first region and the second region,
   wherein a pH of the second electrolytic solution is greater than a pH of the first electrolytic solution,
   wherein the ion exchange membranes include:
   a cation exchange membrane connected to the first region through the path and configured to hinder one kind or more of anions in the first electrolytic solution from passing therethrough; and
   an anion exchange membrane connected to the second region through the path and configured to hinder one kind or more of cations in the second electrolytic solution from passing therethrough, and
   wherein the power source has a photoelectric conversion body disposed in the electrolytic solution tank and having a first surface connected to the reduction electrode and a second surface connected to the oxidation electrode.

2. The device according to claim 1, comprising a bipolar membrane comprising a laminate, the laminate having the cation exchange membrane and the anion exchange membrane.

3. The device according to claim 1, wherein the electrolytic solution tank further includes a third region between the cation exchange membrane and the anion exchange membrane, the third region being configured to store a third electrolytic solution, and the third electrolytic solution contains ions for no reduction reaction of the first substance or no oxidation reaction of the second substance.

4. The device according to claim 3, the device is configured to desalt the third electrolytic solution.

5. The device according to claim 3, further comprising:
   a second path connecting the first region or the second region and the third region.

6. The device according to claim 1, wherein the path is defined by a hole disposed through the reduction electrode, the oxidation electrode, and the photoelectric conversion body.

7. The device according to claim 6, wherein the through hole has a slit shape.

8. The device according to claim 1, wherein the electrolytic solution tank has a pipe-shaped structure, and one of the first and second regions is surrounded by the other of the first and second regions along an inner periphery of the electrolytic solution tank.

9. The device according to claim 1, wherein the reduction electrode contains a reduction catalyst, and the oxidation electrode contains an oxidation catalyst.

10. The device according to claim 1, further comprising a circulating pump provided at the path.

11. An electrochemical reaction device, comprising:
    an electrolytic solution tank including a first region to store a first electrolytic solution containing a first substance comprising carbon dioxide, a second region to store a second electrolytic solution containing a second substance comprising water;
    a reduction electrode disposed in the first region;
    an oxidation electrode disposed in the second region;
    a conductive substrate disposed between the first region and the second region;
    a photoelectric conversion body disposed in the electrolytic solution tank and having a first surface connected to the reduction electrode through the conductive substrate and a second surface connected to the oxidation electrode;
a pipe connecting the first region and the second region to define a path therein; and
a plurality of ion exchange membranes disposed in the pipe to separate the path,
wherein a pH of the second electrolytic solution is greater than a pH of the first electrolytic solution,
wherein the ion exchange membranes include:
a cation exchange membrane connected to the first region through the path and configured to hinder one kind or more of anions in the first electrolytic solution from passing therethrough; and
an anion exchange membrane connected to the first region through the path and configured to hinder one kind or more of cations in the second electrolytic solution from passing therethrough.

* * * * *